United States Patent
Itabashi

(10) Patent No.: US 8,483,946 B2
(45) Date of Patent: Jul. 9, 2013

(54) INFORMATION PROCESSING SYSTEM, INFORMATION PROCESSING APPARATUS AND METHOD, RECORDING MEDIUM, AND PROGRAM

(75) Inventor: Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/429,808

(22) Filed: Mar. 26, 2012

(65) Prior Publication Data

US 2012/0197520 A1 Aug. 2, 2012

Related U.S. Application Data

(63) Continuation of application No. 11/181,971, filed on Jul. 15, 2005, now Pat. No. 8,170,782.

(30) Foreign Application Priority Data

Jul. 16, 2004 (JP) ................................. 2004-209962

(51) Int. Cl.
  *H04L 5/00* (2006.01)
(52) U.S. Cl.
  USPC .............. 701/400; 455/500; 455/73; 455/91; 455/130; 725/39
(58) Field of Classification Search
  USPC .......... 701/400; 455/500, 73, 91, 130; 725/39
  See application file for complete search history.

(56) References Cited

U.S. PATENT DOCUMENTS

| | | | |
|---|---|---|---|
| 5,170,164 A | 12/1992 | Lewis | |
| 5,781,246 A | 7/1998 | Alten et al. | |
| 6,282,412 B1 | 8/2001 | Lyons | |
| 6,400,265 B1 | 6/2002 | Saylor et al. | |
| 6,628,301 B1 * | 9/2003 | Acton et al. | 715/716 |
| 7,149,415 B2 | 12/2006 | Thiagarajan et al. | |
| 7,197,759 B2 | 3/2007 | Barrett et al. | |
| 7,277,767 B2 * | 10/2007 | Yuen et al. | 700/94 |
| 7,421,513 B2 * | 9/2008 | Liang | 709/245 |
| 7,512,651 B2 * | 3/2009 | Offermann | 709/203 |
| 7,599,983 B2 | 10/2009 | Harper et al. | |
| 7,650,621 B2 | 1/2010 | Thomas et al. | |
| 7,865,498 B2 | 1/2011 | Rodriguez | |
| 8,069,435 B1 * | 11/2011 | Lai | 717/106 |
| 8,214,745 B2 * | 7/2012 | Chapman | 715/751 |
| 8,346,929 B1 * | 1/2013 | Lai | 709/226 |
| 2002/0183059 A1 | 12/2002 | Noreen et al. | |
| 2003/0095790 A1 | 5/2003 | Joshi | |
| 2003/0140136 A1 * | 7/2003 | Nakamura | 709/224 |
| 2003/0182056 A1 | 9/2003 | Nozaki et al. | |

(Continued)

FOREIGN PATENT DOCUMENTS

| | | |
|---|---|---|
| JP | 08-068848 A | 3/1996 |
| JP | 10-30933 | 2/1998 |

(Continued)

*Primary Examiner* — Tuan C. To
(74) *Attorney, Agent, or Firm* — Oblon, Spivak, McClelland, Maier & Neustadt, L.L.P.

(57) ABSTRACT

An information processing apparatus includes a reception section that receives marking information from a different information processing apparatus and corresponding to a scene of a broadcast program. The marking information indicates a broadcast station and a broadcast time. The information processing apparatus also includes a processing unit that extracts a Universal Resource Identifier (URI) based on the broadcast station and the broadcast time, and produces navigation information associated with the scene of the broadcast program, based on the URI.

19 Claims, 18 Drawing Sheets

U.S. PATENT DOCUMENTS

| | | | |
|---|---|---|---|
| 2004/0064507 A1* | 4/2004 | Sakata | 709/205 |
| 2004/0175098 A1* | 9/2004 | Calhoon et al. | 386/46 |
| 2005/0246626 A1* | 11/2005 | Lai | 715/513 |
| 2006/0010470 A1 | 1/2006 | Kurosaki et al. | |

FOREIGN PATENT DOCUMENTS

| | | |
|---|---|---|
| JP | 11-203219 | 7/1999 |
| JP | 2001-197329 | 7/2001 |
| JP | 2001-309340 | 11/2001 |
| JP | 2001-309350 | 11/2001 |
| JP | 2001-313619 | 11/2001 |
| JP | 2002-118836 | 4/2002 |
| JP | 2002-221424 | 8/2002 |
| JP | 2002-247530 | 8/2002 |
| JP | 2002-342654 | 11/2002 |
| JP | 2003174607 A * | 6/2003 |
| JP | 2003-196529 | 7/2003 |
| JP | 2004-29006 | 1/2004 |
| JP | 2004040476 A * | 2/2004 |
| JP | 2004-145867 | 5/2004 |
| JP | 2004-171143 | 6/2004 |

* cited by examiner

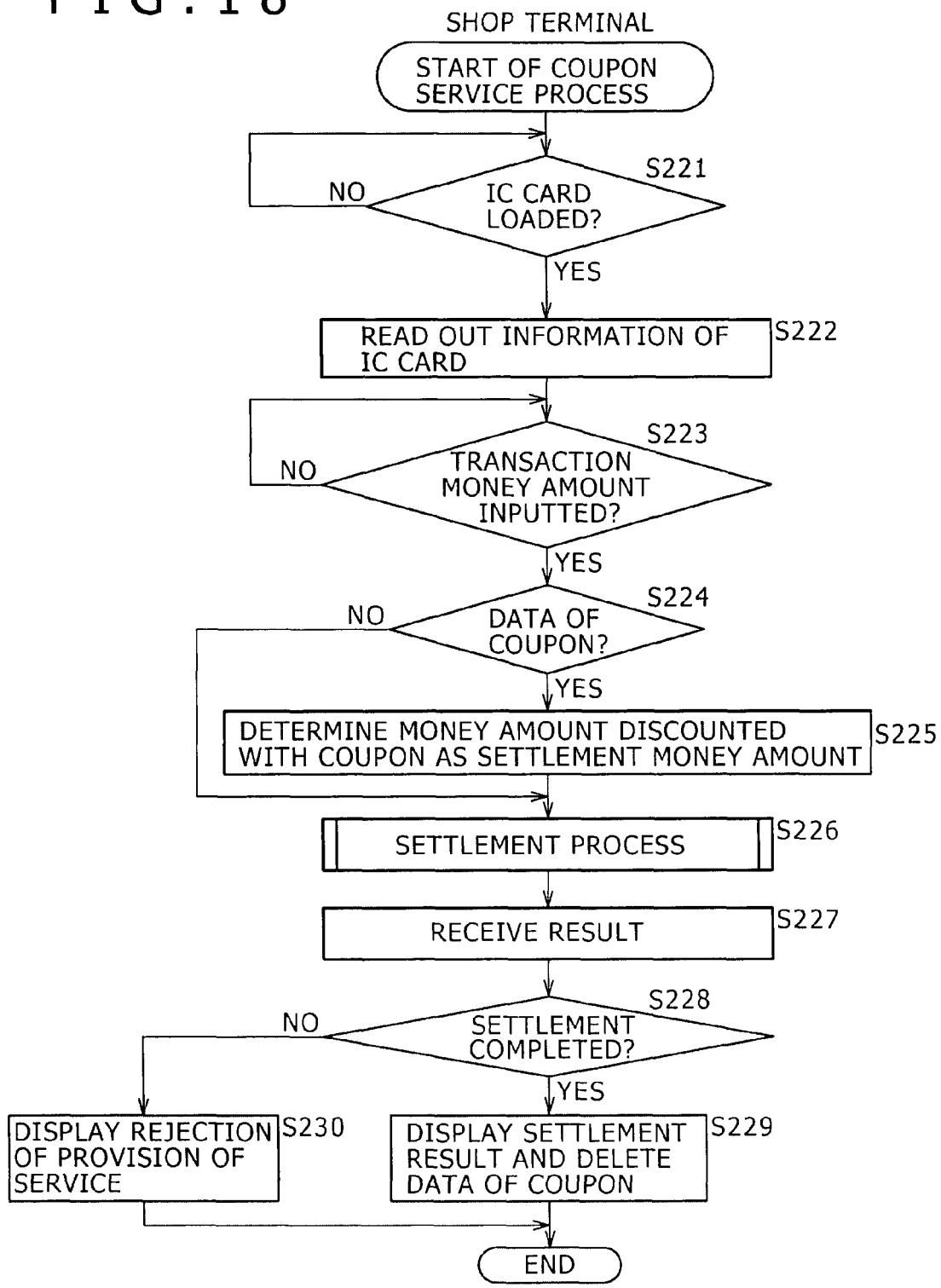

INFORMATION PROCESSING SYSTEM, INFORMATION PROCESSING APPARATUS AND METHOD, RECORDING MEDIUM, AND PROGRAM

CROSS REFERENCES TO RELATED APPLICATIONS

This application is a continuation of and claims the benefit of priority under 35 U.S.C. §120 from U.S. Ser. No. 11/181,971, filed Jul. 15, 2005 now U.S. Pat. No. 8,170,782, the entire contents of which is incorporated herein by reference. The U.S. Ser. No. 11/181,971 claims the benefit of priority under 35 U.S.C. §119 from Japanese Patent Application JP 2004-209962, filed on Jul. 16, 2004.

BACKGROUND OF THE INVENTION

This invention relates to an information processing system, an information processing apparatus and method, a recording medium, and a program.

Car navigation systems have been and are being popularized.

A car navigation system searches for a route from a starting place to a destination both inputted by a user based on map information, sight-seeing information recorded on a recording medium such as an HDD (Hard Disk Drive) or a DVD (Digital Versatile Disk) and other suitable information. Further, the car navigation system acquires position information at present making use of the GPS (Global Positioning System) and guides the user with the route on the real time basis in accordance with the traveling situation of the car.

However, according to conventional car navigation systems, it is difficult to customize information at time when the information was recorded on a recording medium such as an HDD or a DVD, and therefore, it is necessary to periodically update the information recorded on the recording medium.

Thus, a car navigation system has been proposed which produces navigation information based on various kinds of information of a destination and stopover points acquired making use of the Internet or the like. One of the car navigation systems of the type just mentioned is disclosed, for example, in Japanese Patent Laid-Open No. 2000-337911 (hereinafter referred to as Patent Document 1).

SUMMARY OF THE INVENTION

However, if the information of the destination and stopover points is not available to the user through a research in advance, then it is difficult to utilize the Internet to make a search. Therefore, it is necessary for the user to intentionally collect information. Consequently, such a car navigation system as disclosed in Patent Document 1 has a subject to be solved in that time and labor are required for production of navigation information.

There is a need for providing an information processing system, an information processing apparatus and method, a recording medium, and a program which can readily produce navigation information conforming to the interest and the preference of a user. According to an embodiment of the present invention, a broadcast program such as a program of a travel and information on the Internet corresponding to the broadcast program are utilized.

According to an embodiment of the present invention, there is provided an information processing system including a first information processing apparatus and a second information processing apparatus. The first information processing apparatus includes:

first reception means for receiving a broadcast program transmitted from a broadcast station and including information relating to the broadcast program;

outputting means for outputting the broadcast program received by the first reception means;

marking instruction means for issuing an instruction to produce marking information corresponding to a scene of the broadcast program outputted by the outputting means;

marking information production means for producing marking information corresponding to the scene of the broadcast program being outputted from the outputting means when the instruction is issued from the marking instruction means;

first transmission means for transmitting the marking information to the second information processing apparatus; and second reception means for receiving navigation information transmitted from the second information processing apparatus based on the marking information.

The second information processing apparatus includes:

third reception means for receiving the marking information transmitted from the first information processing apparatus;

navigation information production means for producing navigation information based on the marking information received by the third reception means; and second transmission means for transmitting the navigation information produced by the navigation information production means to the first information processing apparatus.

According to another embodiment of the present invention, there is provided an information processing apparatus including:

first reception means for receiving a broadcast program transmitted from a broadcast station and including information relating to the broadcast program;

outputting means for outputting the broadcast program received by the first reception means;

marking instruction means for issuing an instruction to produce marking information corresponding to a scene of the broadcast program outputted by the outputting means;

marking information production means for producing marking information corresponding to the scene of the broadcast program being outputted from the outputting means when the instruction is issued from the marking instruction means;

transmission means for transmitting the marking information to a different information processing apparatus; and second reception means for receiving navigation information transmitted from the different information processing apparatus based on the marking information.

According to a further embodiment of the present invention, there is provided an information processing apparatus including:

a first reception section configured to receive a broadcast program transmitted from a broadcast station and including information relating to the broadcast program;

an outputting section configured to output the broadcast program received by the first reception section;

a marking instruction section configured to issue an instruction to produce marking information corresponding to a scene of the broadcast program outputted by the outputting section;

a marking information production section configured to produce marking information corresponding to the scene of the broadcast program being outputted from the outputting section when the instruction is issued from the marking instruction section;

a transmission section configured to transmit the marking information to a different information processing apparatus; and a second reception section configured to receive navigation information transmitted from the different information processing apparatus based on the marking information.

According to a still further embodiment of the present invention, there is provided an information processing method for an information processing apparatus, including the steps of:

first receiving a broadcast program transmitted from a broadcast station and including information relating to the broadcast program;

outputting the broadcast program received by the process at the first reception step;

issuing an instruction to produce marking information corresponding to a scene of the broadcast program outputted by the process at the outputting step;

producing marking information corresponding to the scene of the broadcast program being outputted when the marking instruction is issued by the process at the marking instruction step;

a transmission step of transmitting the marking information to a different information processing apparatus; and second receiving navigation information transmitted from the different information processing apparatus based on the marking information.

According to a yet further embodiment of the present invention, there is provided a recording medium on which a computer-readable program for an information processing apparatus is recorded. The program causes a computer to execute the steps of:

first receiving a broadcast program transmitted from a broadcast station and including information relating to the broadcast program;

outputting the broadcast program received by the process at the first reception step;

issuing an instruction to produce marking information corresponding to a scene of the broadcast program outputted by the process at the outputting step;

producing marking information corresponding to the scene of the broadcast program being outputted when the marking instruction is issued by the process at the marking instruction step;

transmitting the marking information to a different information processing apparatus; and second receiving navigation information transmitted from the different information processing apparatus based on the marking information.

According to an additional embodiment of the present invention, there is provided an information processing apparatus including:

reception means for receiving marking information transmitted from a different information processing apparatus and corresponding to a scene of a broadcast program;

navigation information production means for producing navigation information based on the marking information received by the reception means; and transmission means for transmitting the navigation information produced by the navigation information production means to the different information processing apparatus.

According to another additional embodiment of the present invention, there is provided an information processing apparatus including:

a reception section configured to receive marking information transmitted from a different information processing apparatus and corresponding to a scene of a broadcast program;

a navigation information production section configured to produce navigation information based on the marking information received by the reception section; and a transmission section configured to transmit the navigation information produced by the navigation information production section to the different information processing apparatus.

According to a further additional embodiment of the present invention, there is provided an information processing method for an information processing apparatus, including the steps of:

receiving marking information transmitted from a different information processing apparatus and corresponding to a scene of a broadcast program;

producing navigation information based on the marking information received by the process at the reception step; and transmitting the navigation information produced by the process at the navigation information production step to the different information processing apparatus.

According to a still further additional embodiment of the present invention, there is provided a recording medium on which a computer-readable program for an information processing apparatus is recorded, the program causing a computer to execute the steps of:

receiving marking information transmitted from a different information processing apparatus and corresponding to a scene of a broadcast program;

producing navigation information based on the marking information received by the process at the reception step; and transmitting the navigation information produced by the process at the navigation information production step to the different information processing apparatus.

In the information processing system, the first information processing apparatus receives a broadcast program transmitted from a broadcast station and including information relating to the broadcast program, and outputs the received broadcast program. Further, the first information processing apparatus issues an instruction to produce marking information corresponding to a scene of the broadcast program, and produces marking information corresponding to the scene of the broadcast program being outputted when the instruction is issued. Furthermore, the first information processing apparatus transmits the marking information to the second information processing apparatus, and receives navigation information transmitted from the second information processing apparatus based on the marking information. The second information processing apparatus receives the marking information transmitted from the first information processing apparatus, produces navigation information based on the marking information, and transmits the produced navigation information to the first information processing apparatus.

In the information processing apparatus and method and the recording medium, a broadcast program transmitted from a broadcast station and including information relating to the broadcast program is received and outputted, and an instruction to produce marking information corresponding to a scene of the outputted broadcast program is issued. Then, marking information corresponding to the scene of the broadcast program being outputted when the marking instruction is issued is produced and transmitted to a different information processing apparatus. Thereafter, navigation information transmitted from the different information processing apparatus based on the marking information is received.

In the information processing apparatus and method and the recording medium, marking information transmitted from a different information processing apparatus and corresponding to a scene of a broadcast program is received. Then, navigation information is produced based on the received marking information and is transmitted to the different information processing apparatus.

The first information processing apparatus and the second information processing apparatus may each be an independent apparatus or be a block which performs the respective information processing.

With the information processing apparatus and methods and the recording media, by utilizing a broadcast program such as a travel program and information on the Internet corresponding to the broadcast program, navigation data conforming to the interest and the preference of a user can be produced readily.

The above and other objects, features and advantages of the present invention will become apparent from the following description and the appended claims, taken in conjunction with the accompanying drawings in which like parts or units denoted by like reference symbols.

BRIEF DESCRIPTION OF THE DRAWINGS

FIG. 18 is a flow chart illustrating a coupon service process.

DETAILED DESCRIPTION OF THE PREFERRED EMBODIMENTS

Figure 1:
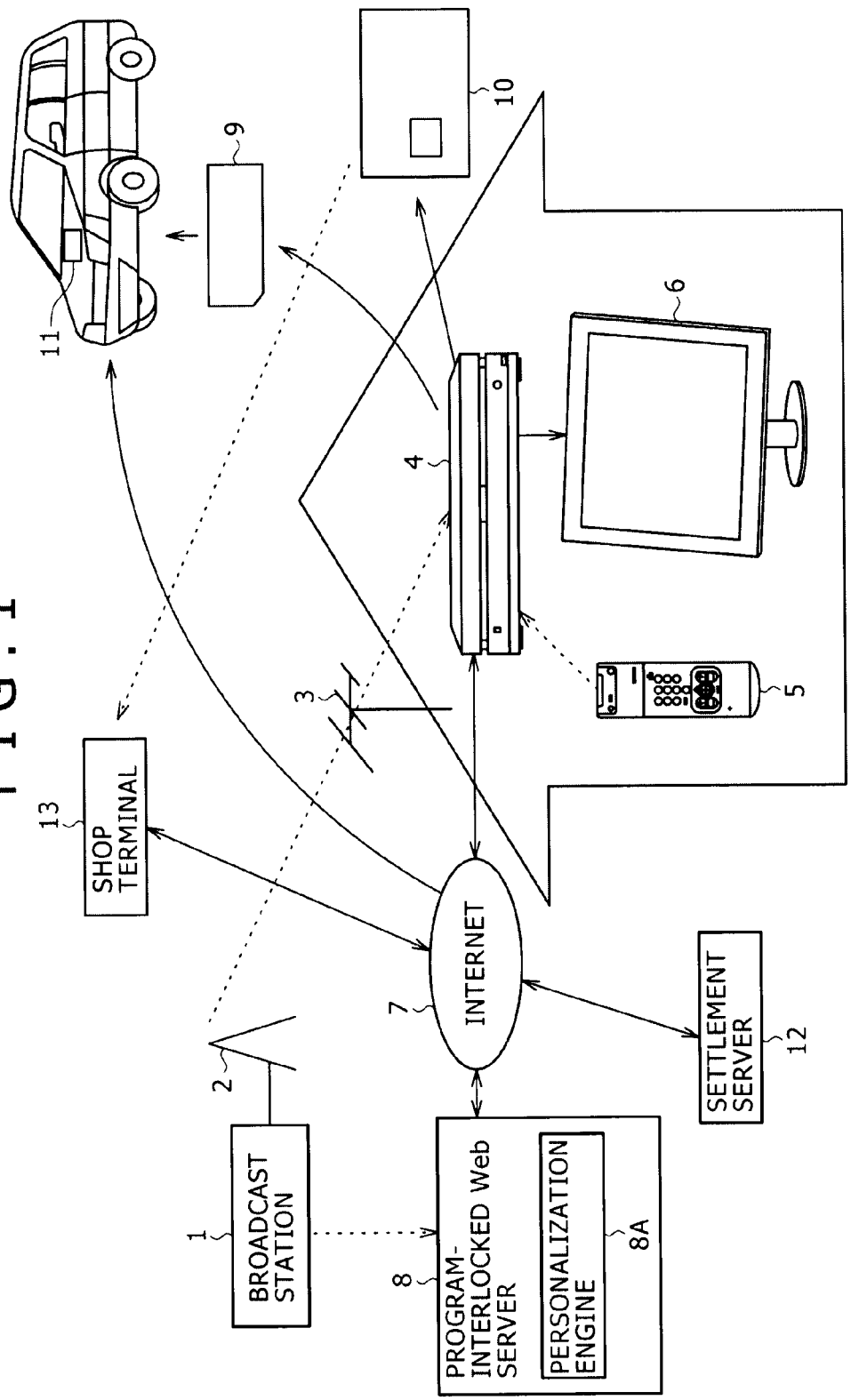
FIG. 1 is a block diagram showing a configuration of a navigation information distribution system to which the present invention is applied.

Before a preferred embodiment of the present invention is described in detail, a corresponding relationship between several features of the present invention and particular units of the preferred embodiment described below is described. The description, however, is merely for the confirmation that the particular units supporting the invention are disclosed in the description of the embodiment of the present invention. Accordingly, even if some particular unit recited in description of the embodiment is not recited as one of the features in the following description, this does not signify that the particular unit does not correspond to the feature. On the contrary, even if some particular unit is recited as a unit corresponding to one of the features, this does not signify that the unit does not correspond to any other feature than the unit.

Further, the following description does not signify that the prevent invention corresponding to particular units described in the embodiment of the present invention is all described in the specification. In other words, the following description does not deny the presence of an invention described in the description but is not specifically applied for patent, that is, the description does not deny the presence of an invention which may be filed for patent in a divisional patent application or may be additionally included into the present patent application as a result of later amendment to the claims.

According to an embodiment of the present invention, an information processing system includes a first information processing apparatus and a second information processing apparatus. The first information processing apparatus includes a first reception section (for example, a tuner 210 of FIG. 5) for receiving a broadcast program transmitted from a broadcast station and including information relating to the broadcast program, an outputting section (for example, a television receiver 6 of FIG. 1) for outputting the broadcast program received by the first reception section, a marking instruction section (for example, a remote controller 5 of FIG. 5) for issuing an instruction to produce marking information corresponding to a scene of the broadcast program outputted by the outputting section, a marking information production section (for example, a marking information recording section 208 of FIG. 5) for producing marking information corresponding to the scene of the broadcast program being outputted from the outputting section when the instruction is issued from the marking instruction section, a first transmission section (for example, a communication section 202 of FIG. 5 executing a process at step S58 of a flow chart of FIG. 11) for transmitting the marking information to the second information processing apparatus, and a second reception section (for example, the communication section 202 of FIG. 5 executing a process at step S61 of the flow chart of FIG. 11) for receiving navigation information transmitted from the second information processing apparatus based on the marking information. The second information processing apparatus includes a third reception section (for example, a communication section 234 of FIG. 6 executing a process at step S72 of the flow chart of FIG. 11) for receiving the marking information transmitted from the first information processing apparatus, a navigation information production section (for example, a personalization engine 8a of FIG. 6) for producing navigation information based on the marking information received by the third reception section, and a second transmission section (for example, the communication section 234 of FIG. 6 executing a process at step S76 of the flow chart of FIG. 11) for transmitting the navigation information produced by the navigation information production section to the first information processing apparatus.

According to another embodiment of the present invention, an information processing apparatus includes first reception means (for example, a tuner 210 of FIG. 5) for receiving a broadcast program transmitted from a broadcast station and including information relating to the broadcast program, outputting means (for example, a television receiver 6 of FIG. 1) for outputting the broadcast program received by the first reception means, marking instruction means (for example, a marking remote controller 5 of FIG. 5) for issuing an instruction to produce marking information corresponding to a scene of the broadcast program outputted by the outputting means, marking information production means (for example, a marking information recording section 208 of FIG. 5) for producing marking information corresponding to the scene of the broadcast program being outputted from the outputting means when the instruction is issued from the marking instruction means, transmission means (for example, a communication section 202 of FIG. 5 executing a process at step S58 of a flow chart of FIG. 11) for transmitting the marking information to a different information processing apparatus, and second reception means (for example, the communication section 202 of FIG. 5 executing a process at step S61 of a flow chart of FIG. 11) for receiving navigation information transmitted from the different information processing apparatus based on the marking information.

Figure 5:
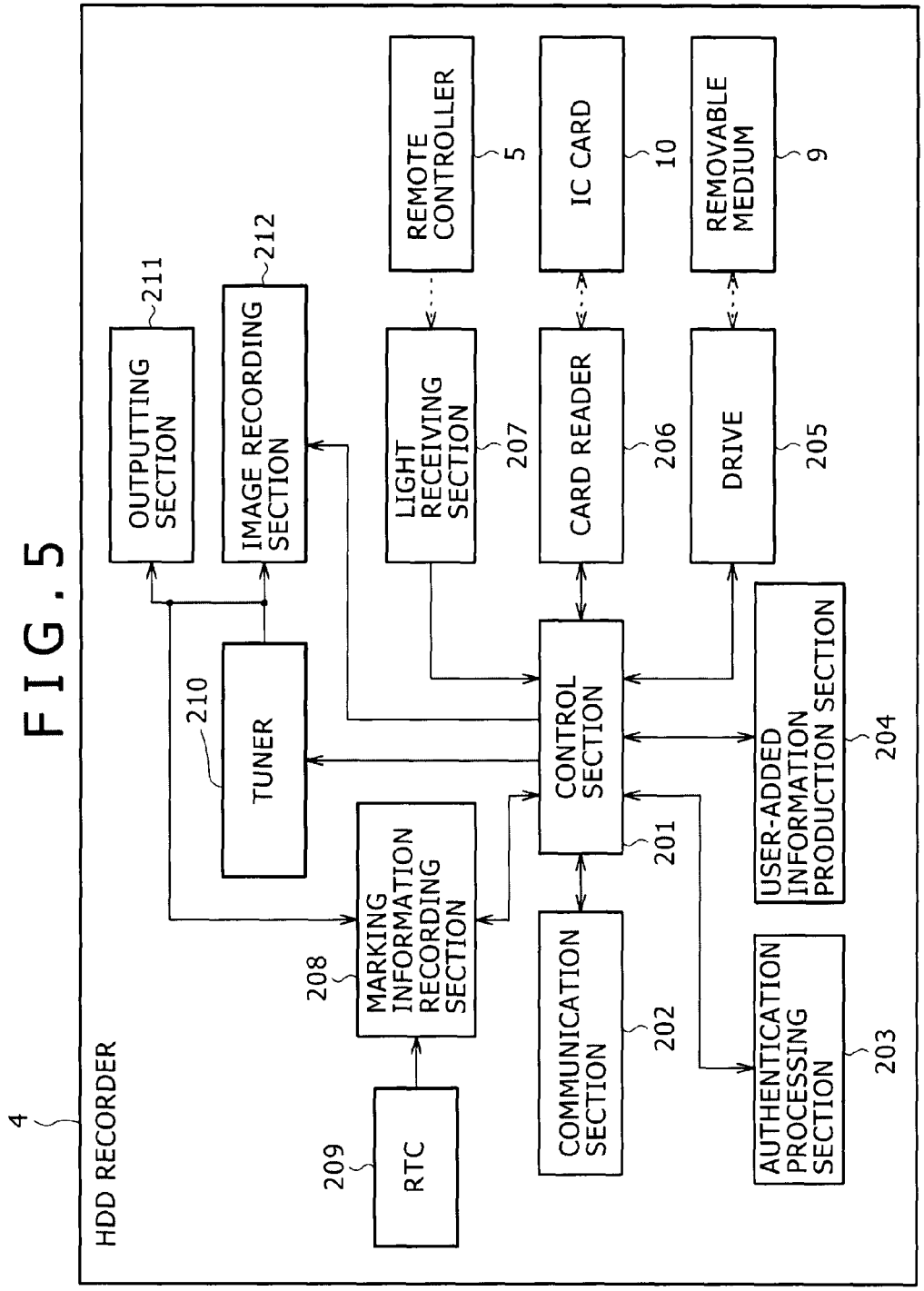
FIG. 5 is a block diagram illustrating functions implemented by the HDD recorder shown in FIG. 1.

The information processing apparatus may further include restriction condition inputting means (for example, a user-added information production section 204 of FIG. 5) for inputting a restriction condition to the production of the navigation information, the transmission means transmitting the marking information to which the restriction condition is added to the different information processing apparatus.

The information processing apparatus may further include navigation information recording means (for example, a drive 205 of FIG. 5) for recording the navigation information on a removable medium.

Figure 10:
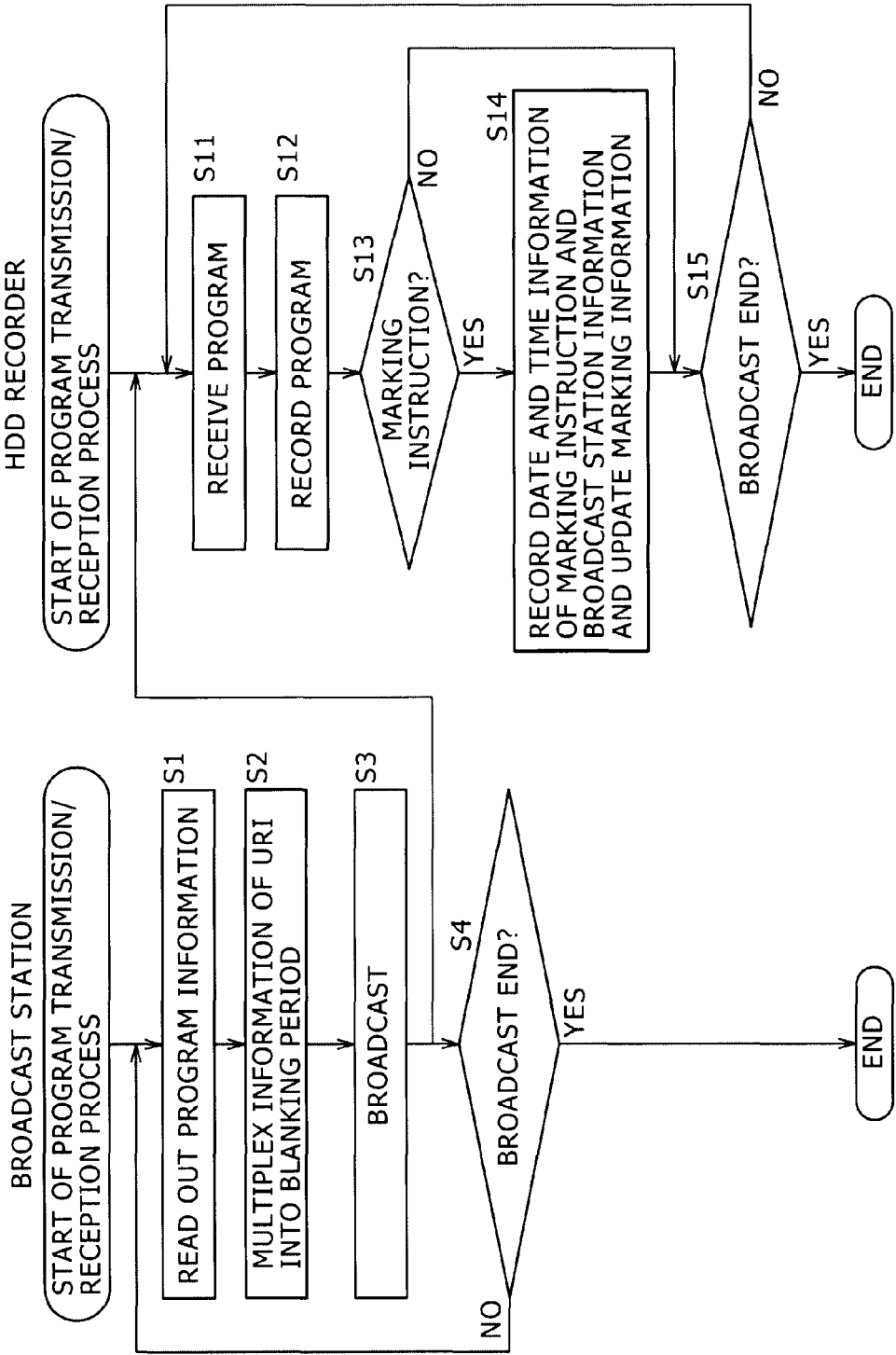
FIG. 10 is a flow chart illustrating a program transmission/reception process.
Figure 11:
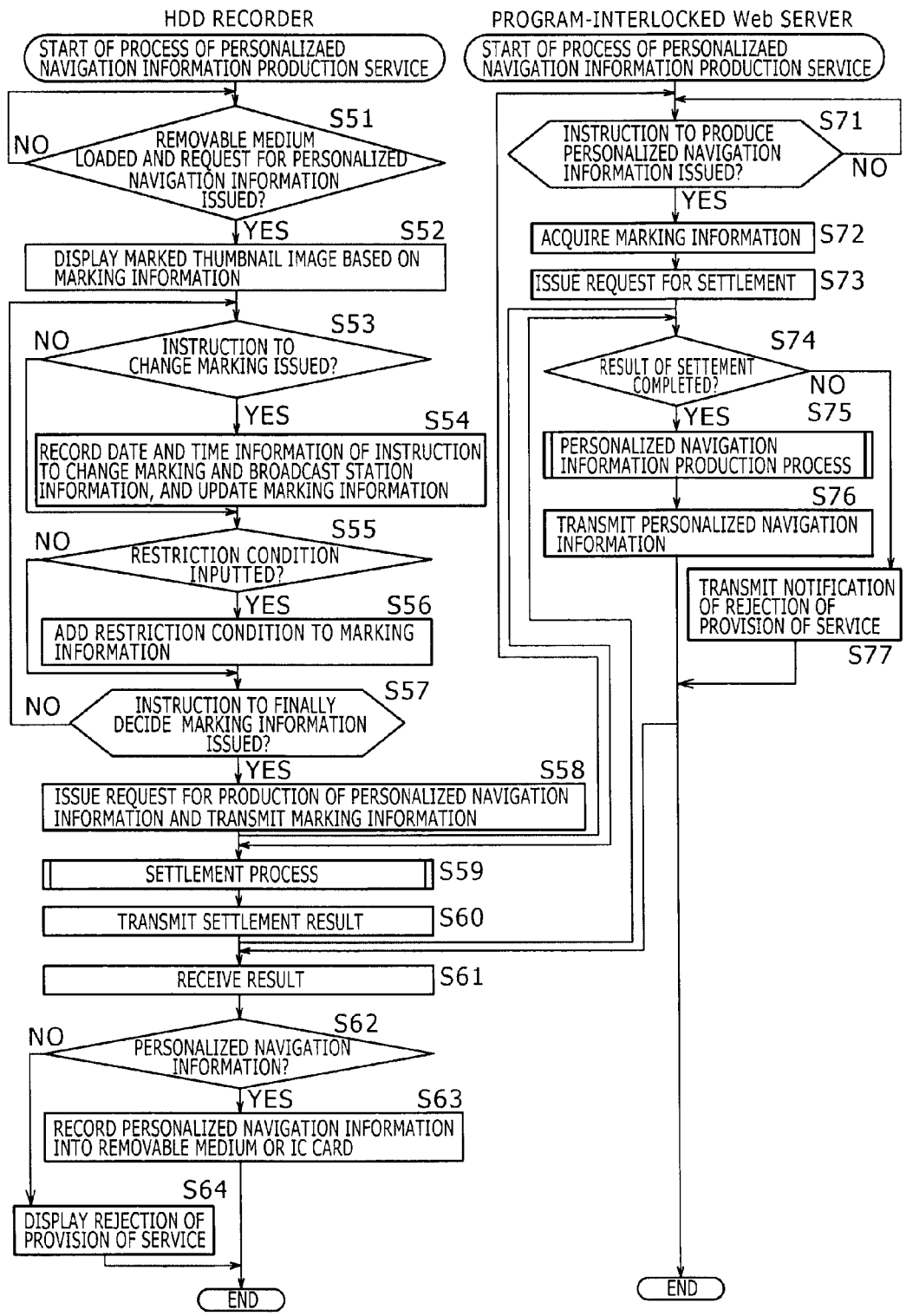
FIG. 11 is a flow chart illustrating a personalized navigation information production process.

According to a still further embodiment of the present invention, an information processing method for an information processing apparatus includes the steps of first receiving a broadcast program transmitted from a broadcast station and including information relating to the broadcast program (for example, a process at step S11 of a flow chart of FIG. 10), outputting the broadcast program received by the process at the first reception step (for example, a process at step S12 of the flow chart of FIG. 10), issuing an instruction to produce marking information corresponding to a scene of the broadcast program outputted by the process at the outputting step (for example, a process at step S13 of the flow chart of FIG. 10), producing marking information corresponding to the scene of the broadcast program being outputted when the marking instruction is issued by the process at the marking instruction step (for example, a process at step S14 of the flow chart of FIG. 10), transmitting the marking information to a different information processing apparatus (for example, a process at step S58 of a flow chart of FIG. 11), and second receiving navigation information transmitted from the different information processing apparatus based on the marking information (for example, a process at step S61 of the flow chart of FIG. 11).

According to a yet further embodiment of the present invention, an information processing apparatus includes reception means (for example, a communication section 234 of FIG. 6 executing a process at step S72 of a flow chart of FIG. 11) for receiving marking information transmitted from a different information processing apparatus and corresponding to a scene of a broadcast program, navigation information production means (for example, a personalization engine 8a of FIG. 6) for producing navigation information based on the marking information received by the reception means, and transmission means (for example, a communication section 234 of FIG. 6 executing a process at step S76 of the flow chart of FIG. 11) for transmitting the navigation information produced by the navigation information production means to the different information processing apparatus.

The information processing apparatus may further include storage means (for example, a navigation data DB 232 of FIG. 6) for storing basic navigation information coordinated with the broadcast program, the navigation information production means being operable to select the basic navigation information based on the marking information and produce the navigation information based on the basic navigation information.

The information processing apparatus may further include history information storage means (for example, a point history information DB 249 of FIG. 6) for storing navigation information produced in the past by the navigation information production means as history information for each user, the navigation information production means producing navigation information based on the basic navigation information and the history information.

According to a yet further embodiment of the present invention, an information processing method for an information processing apparatus includes the steps of receiving marking information transmitted from a different information processing apparatus and corresponding to a scene of a broadcast program (for example, a process at step S72 of a flow chart of FIG. 11), producing navigation information based on the marking information received by the process at the reception step (for example, a process at step S75 of the flow chart of FIG. 11), and transmitting the navigation information produced by the process at the navigation information production step to the different information processing apparatus (for example, a process at step S76 of the flow chart of FIG. 11).

It is to be noted that the corresponding relationships regarding the recording media and programs are similar to those of the information processing methods, and therefore, overlapping description of them is omitted hereinto avoid redundancy.

Referring first to FIG. 1, there is shown a configuration of a navigation information distribution system to which the present invention is applied.

A broadcast station 1 broadcasts a broadcast program such as a travel program. In particular, the broadcast station 1 broadcasts the broadcast program in such a form that a URI (Universal Resource Identifier) indicative of an address of a server not shown which retains an HP (Home Page) relating to a place introduced in the broadcast program is placed in a vertical blanking period or the like of a broadcast signal used for broadcasting of the broadcast program.

An HDD recorder 4 receives the program broadcast from an antenna 2 of the broadcast station 1 by means of an antenna 3 and converts the received program into a predetermined signal. Then, the HDD recorder 4 displays the signal on a television receiver 6 and records the signal into an HDD (Hard Disk Drive) built therein. The HDD recorder 4 records information of the broadcast date and time and the broadcast station information of the broadcast program as marking information based on a signal generated in response to an operation of a remote controller 5 when a user wants to mark.

The HDD recorder 4 displays thumbnail images of programs recorded in the HDD based on such marking information and reproduces, if one of the thumbnail images is selected by the remote controller 5, a corresponding program of broadcast date and time. Or, the HDD recorder 4 reads out the URI multiplexed in a vertical blanking period at the corresponding broadcast date and time and downloads information of an HP existing at the address of the URI and retained in a server not shown through the Internet 7 so that the information is displayed on the television receiver 6. Further, if the display information of the HP is operated by the remote controller 5, then the HDD recorder 4 downloads corresponding information from the server not shown through the Internet 7 so that the information is displayed.

Thus, for example, if the broadcast program is a travel program or the like, then the user can operate, at a timing at which the broadcast program is being broadcast or at another timing at which, after the broadcast program is recorded, the recorded program is being reproduced, the remote controller 5 on a scene of the broadcast program in which the user is interested (with a scene on which a place which the user should like to visit) to access the server not shown based on the URI multiplexed at the broadcasting date and time of the broadcast program so that a relating HP may be downloaded and displayed. Further, in such a case that the user wants to incorporate the URI into a point of navigation information through a process hereinafter described, the URI can be recorded as marking information by an operation of the remote controller 5.

Further, the HDD recorder 4 transmits the marking information produced in such a manner as described above to a program-interlocked web server 8. Then, the HDD recorder 4 receives navigation information produced based on the transmitted marking information from the program-interlocked web server 8. Furthermore, the HDD recorder 4 records the navigation information received from the program-interlocked web server 8 in this manner on a removable medium 9.

After a car navigation apparatus 11 is loaded with the removable medium 9 on which the navigation information is recorded, it executes, based on the recorded navigation information, a route guidance in which the place introduced by the broadcast program (for example, a place guided in the travel program) is to be visited.

Further, the HDD recorder 4 cooperates with a settlement server 12 to execute a settlement process of a charge for production of the navigation information based on the marking information by the program-interlocked web server 8 using an IC card 10. Furthermore, when the HDD recorder 4 acquires the navigation information from the program-interlocked web server 8, for example, if it acquires coupon information which can be utilized in a shop acting as a sponsor of the broadcast program or an associate shop which exists on the route guided by the car navigation apparatus 11 based on the navigation information, then it records the coupon information into the IC card 10. As a result of the process described, such a service that, when the user having watched the broadcast program and prepared the navigation information utilizes the IC card 10, in which the coupon information is recorded, to cause the settlement server 12 to execute a settlement process for paying the predetermined charge, for example, in a shop of the sponsor of the broadcast program, the settlement server 12 performs the settlement process with a charge discounted by a predetermined amount of money through a shop terminal 13 provided in the shop of the sponsor can be provided to the user.

The program-interlocked web server 8 is managed and administrated by the broadcast station 1 (or a trader entrusted by the broadcast station 1) and manages and administrates a production service of navigation information corresponding to a broadcast program broadcast from the broadcast station 1. If marking information is supplied to the program-interlocked web server 8 from an electronic apparatus represented by the HDD recorder 4, then the program-interlocked web server 8 utilizes a personalization engine 8a to produce corresponding navigation information and sends back the navigation information to the HDD recorder 4 from which the request has been received. Then, the broadcast station 1 which manages and administrates the program-interlocked web server 8 performs a settlement process of a charge for the production service of navigation information on the user who has issued the request for production of navigation information. Here, calculation of the charge for the production service of navigation information is performed between the settlement server 12 and the HDD recorder 4. However, the calculation may otherwise be performed, for example, between the settlement server 12 and the car navigation apparatus 11.

When the settlement server 12 performs the settlement process together with the HDD recorder 4, it performs an authentication process of the challenge and response type in order to authenticate the IC card 10 of the user and executes the settlement process when the authentication results in success. The settlement process is hereinafter described in detail.

The car navigation apparatus 11 is generally incorporated in an automobile. If the removable medium 9 in which car navigation information is recorded by the HDD recorder 4 is loaded into the car navigation apparatus 11, then the car navigation apparatus 11 executes a route guidance to a destination depending upon the position of the automobile and travel information based on the car navigation information recorded in the removable medium 9. Further, the car navigation apparatus 11 presents information of a tourist resort (which may be hereinafter referred to also as point) existing on the route to the destination based on the information recorded on the removable medium 9.

The shop terminal 13 may be installed in various shops and execute a settlement process using the IC card 10 together with the settlement server 12. If coupon information which is effective for a settlement process in an applicable shop is recorded in the IC card 10, then the shop terminal 13 executes a corresponding service, for example, a settlement process with a discount.

It is to be noted that, while the television receiver 6 in FIG. 1 is connected to the HDD recorder 4 and utilized as a monitor, channel selection by a tuner may be performed by the television receiver 6. Further, the remote controller 5 may issue a recognizable signal to the television receiver 6 in addition to issuance of a signal to the HDD recorder 4.

Now, a configuration of the HDD recorder 4 is described with reference to FIG. 2.

A CPU (Central Processing Unit) 31 executes various processes in accordance with a program stored in a ROM (Read Only Memory) 32 or a storage section 38. A program to be executed by the CPU 31 and data to be used by the CPU 31 are suitably stored into a RAM (Random Access Memory) 33. The CPU 31, ROM 32 and RAM 33 are connected to each other by a bus 34.

An input/output interface 35 is connected to the CPU 31 through the bus 34. An inputting section 36 including a keyboard, a mouse, a microphone and/or a light receiving unit for receiving a signal from the remote controller 5 and an outputting section 37 including a display unit, a speaker, a sound output terminal and/or an image output terminal are connected to the input/output interface 35. The CPU 31 executes various processes in response to an instruction inputted from the inputting section 36.

The storage section 38 connected to the input/output interface 35 is formed from, for example, a hard disk and stores programs to be executed by the CPU 31 and various data to be used by the CPU 31. Further, when a broadcast signal transmitted in a frequency controlled by the CPU 31 is received by a tuner 40, the storage section 38 stores the received broadcast program. Further, when a broadcast program of a broadcast signal received by the tuner 40 or a broadcast program recorded in the storage section 38 is to be displayed on the television receiver 6 through the sound output terminal or the image output terminal of the outputting section 37, if a request for marking the broadcast program is received from the remote controller 5, then the storage section 38 records the broadcast date and time of the broadcast program at the timing of the request and information of a channel in which the broadcast program is broadcast.

A communication section 39 has a communication function through a network such as the Internet 7. The communication section 39 communicates various data with various apparatus such as, for example, the program-interlocked web server 8 or the settlement server 12.

A drive 41 connected to the input/output interface 35 drives, when a removable memory such as, for example, a magnetic disk 51, an optical disk 52, a magneto-optical disk 53 or a semiconductor memory 54 is loaded therein, the removable memory to acquire a program or data recorded on the removable memory. The acquired program or data are transferred to and stored into the storage section 38 as occasion demands. It is to be noted that the magnetic disk 51, optical disk 52, magneto-optical disk 53 or semiconductor memory 54 corresponds to the removable medium 9 described hereinabove.

A card reader 42 records information into or reads out information recorded in the IC card 10 in accordance with an instruction from the CPU 31. For example, coupon information and so forth are recorded into the optical disk 52.

Now, a configuration of the program-interlocked web server 8 is described with reference to FIG. 3. The configuration of the program-interlocked web server 8 is similar to that of the HDD recorder 4 of FIG. 2, and includes a CPU 71, a ROM 72, a RAM 73, a bus 74, an input/output interface 75, an inputting section 76, an outputting section 77, a storage section 78, a communication section 79 and a drive 80 which correspond to the CPU 31, ROM 32, RAM 33, bus 34, input/output interface 35, inputting section 36, outputting section 37, storage section 38 and communication section 39 of the HDD recorder 4. Further, a magnetic disk 91, an optical disk 92, a magneto-optical disk 93 and a semiconductor memory 94 used in the program-interlocked web server 8 correspond to the magnetic disk 51, optical disk 52, magneto-optical disk 53 and semiconductor memory 54 used in the HDD recorder 4, respectively.

However, since the HDD recorder 4 and the program-interlocked web server 8 are different from each other in that the basic applications thereof are an image recording and reproduction apparatus and a computer, respectively, the performances of the individual components are specified in accordance with the individual applications as occasion demands. Further, the program-interlocked web server 8 is different in application from the HDD recorder 4 in that a program for executing the personalization engine 8a hereinafter described is stored in the storage section 78.

Now, a configuration of the car navigation apparatus 11 is described with reference to FIG. 4. The configuration of the car navigation apparatus 11 is similar to that of the HDD recorder 4 of FIG. 2, and includes a CPU 111, a ROM 112, a RAM 113, a bus 114, an input/output interface 115, an inputting section 116, an outputting section 117, a storage section 118, a communication section 119, a drive 122 and a card reader 123 which correspond to the CPU 31, ROM 32, RAM 33, bus 34, input/output interface 35, inputting section 36, outputting section 37, storage section 38, communication section 39, drive 41 and card reader 42 of the HDD recorder 4, respectively. Further, a magnetic disk 131, an optical disk 132, a magneto-optical disk 133 and a semiconductor memory 134 used in the car navigation apparatus 11 correspond to the magnetic disk 51, optical disk 52, magneto-optical disk 53 and semiconductor memory 54 used in the HDD recorder 4, respectively.

However, since the HDD recorder 4 and the car navigation apparatus 11 are different from each other in that the basic applications thereof are an image recording and reproduction apparatus and a navigation apparatus for guiding a route, respectively, the performances of the individual components are specified in accordance with the individual applications as occasion demands. Further, the car navigation apparatus 11 is different in application from the HDD recorder 4 in that a program for reading out navigation information recorded on the removable medium 9 (magnetic disk 131, optical disk 132, magneto-optical disk 133, semiconductor memory 134 or the like) to guide a route is stored in the storage section 118.

The car navigation apparatus 11 further includes a GPS section 120 which acquires signals transmitted from a plurality of satellites not shown to calculate position information (information of the latitude and the altitude) on the earth at present. A vehicle speed detection section 121 detects a vehicle speed pulse generated in response to rotation of a wheel of the automobile and calculates the traveling direction and the traveling speed of the automobile at present based on a result of measurement of a three-dimensional accelerometer built therein.

It is to be noted that the settlement server 12 and the shop terminal 13 have a configuration basically similar to that of the program-interlocked web server 8, and therefore, overlapping description thereof is omitted herein to avoid redundancy. However, an apparatus similar to the card reader 42 of the HDD recorder 4 or the card reader 123 of the car navigation apparatus 11 is connected to the shop terminal 13 so that the shop terminal 13 can read out information recorded in the IC card 10 and necessary for a settlement process or record predetermined information relating to the settlement process into the IC card 10.

Now, functions implemented by the HDD recorder 4 are described with reference to FIG. 5.

The control section 201 controls action of the entire HDD recorder 4. A communication section 202 may be, for example, a modem, a terminal adapter, a router or the like and communicates with the program-interlocked web server 8, settlement server 12 or the like through the Internet 7 to transmit and receive various kinds of information under the control of the control section 201.

A light receiving section 207 receives a signal of infrared rays or the like emitted from the remote controller 5 in response to contents of an operation when the remote controller 5 is operated by the user and converts and supplies the received signal into and as a predetermined signal to the control section 201. The control section 201 executes various processes in response to the signal supplied thereto from the light receiving section 207. Here, the control signal from the remote controller 5 may be transmitted to the HDD recorder 4 using the IP protocol through a radio LAN, and a reception section provided in place of the HDD recorder 4 may receive the control signal. It is to be noted that the control section 201 may operate not only in response to a signal from the remote controller 5 but also in response to an operation, for example, of an operation button provided on the body of the HDD recorder 4 not shown.

A tuner 210 converts a broadcast signal transmitted in a predetermined frequency and received by the antenna 3 into a predetermined image signal and supplies the image signal to an image recording section 212 and an outputting section 211 under the control of the control section 201. The image recording section 212 records the image signal supplied thereto from the tuner 210 or reads out and outputs the recorded image signal to the outputting section 211 under the control of the control section 201. The outputting section 211 is, for example, an output terminal and outputs the image signal supplied thereto from the tuner 210 or the image recording section 212 to the television receiver 6 of FIG. 1 so that the image signal is displayed on the television receiver 6.

If the remote controller 5 is operated so as to issue a marking instruction in a state wherein an image signal is supplied to the outputting section 211, that is, in a state wherein an image signal is outputted from the tuner 210 or the image recording section 212 and a broadcast program is displayed on the television receiver 6, then a marking information recording section 208 reads out the present time from an RTC (Real Time Clock) 209 to determine broadcast date and time of the broadcast program and records (marks) the determined broadcast date and time as marking information together with information of the broadcast station of the broadcast program.

Further, the marking information recording section 208 outputs, based on the marking information recorded therein, an image at the timing of the marking recorded in the image recording section 212 as a thumbnail image to the outputting section 211. Further, if this thumbnail image is selected, then the marking information recording section 208 controls the image recording section 212 through the control section 201 to reproduce the recorded program from the position of the marking of the selected thumbnail image.

Further, the marking information recording section 208 stores the URI of the broadcast signal at the timing of the marking. When the thumbnail image is designated, the marking information recording section 208 controls the communication section 202 through the control section 201 to access a server not shown based on the URI of the broadcast signal at the timing so that data of a predetermined HP or the like are downloaded from the server and displayed on the television receiver 6 through the outputting section 211.

According to such a configuration as described above, the user can mark a broadcast program not only at a timing at which the broadcast program is being broadcast but also at a desired timing even while the user watches a broadcast program recorded in the image recording section 212, and such marking can be performed repetitively as occasion demands while the broadcast program is watched. It is to be noted that naturally it is possible to delete marking information marked once.

Further, in such a case that the broadcast program is a travel program, the user can rapidly acquire information relating to a place which is being introduced in the broadcast program being broadcast in the travel program and can record interested places as marking information.

Further, the control section 201 can read out marking information recorded in the marking information recording section 208 and control the communication section 202 to issue a request for production of navigation information to the program-interlocked web server 8. If the control section 201 acquires navigation information produced in accordance with the request, then it controls a drive 205 to record the acquired navigation information into the removable medium 9.

When the control section 201 issues a request for production of navigation information to the program-interlocked web server 8 based on marking information as described above, a user-added information production section 204 produces user-added information of a restriction condition and adds the produced information to the marking information. In particular, the user-added information may include various kinds of selection information which becomes restriction conditions to production of navigation information such as information of a starting place, a destination, schedule information such as starting date and time and arriving date and time (or the morning, daytime, evening or night), and so forth. Here, the selection information is information which becomes a restriction condition set in advance by the side of the producer of the broadcast program and navigation information such as, for example, "family", "couple" or "gourmet" as an object or "Ikebukuro" in a program of "Chinese noodle collection" as a district.

An authentication processing section 203 executes, when a request for a settlement process is issued to the settlement server 12 making use of the IC card 10 loaded in a card reader 206 connected to the HDD recorder 4, an authentication process necessary for the settlement.

Figure 6:
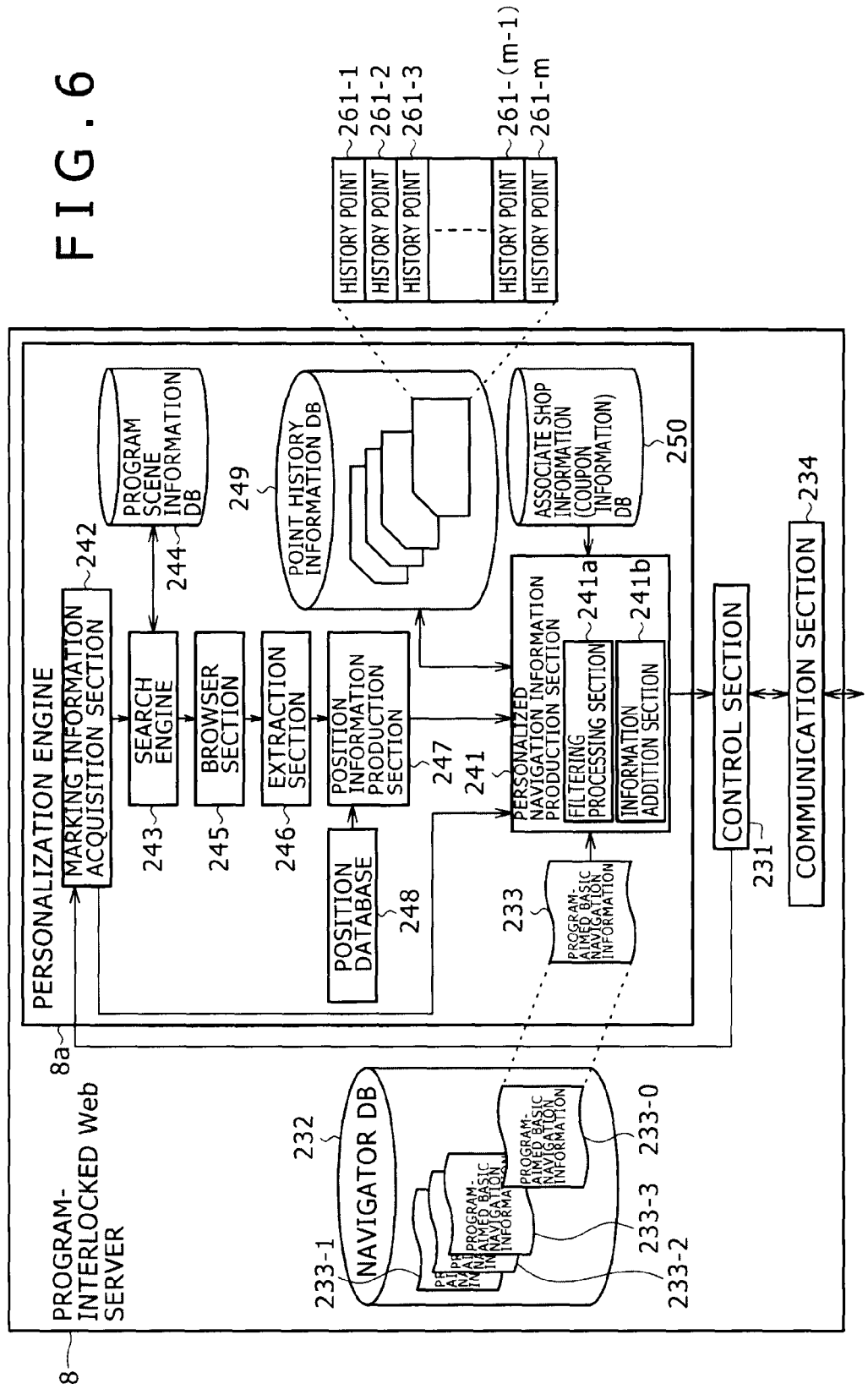
FIG. 6 is a block diagram illustrating functions implemented by the program-interlocked web server shown in FIG. 1.

Now, functions implemented by the program-interlocked web server 8 are described with reference to FIG. 6.

A control section 231 controls operation of the program-interlocked web server 8.

A navigator DB (navigation database) 232 has program-aimed basic navigation information 233-1 to 233-*o* for individual broadcasts of broadcast programs recorded therein. In the program-aimed basic navigation information 233, a starting point and an ending point necessary for route guidance or route information is recorded in a unit of a point for each section of a branch between the starting point and the ending point. It is to be noted that details of the program-aimed basic navigation information 233 are hereinafter described.

A communication section 234 transmits and receives various kinds of data to or from the HDD recorder 4 or the settlement server 12 through a network such as the Internet 7 under the control of the control section 231.

The personalization engine 8*a* produces navigation information (personalized navigation information) conforming to the interest and the liking of the user based on marking information, point history information and restriction conditions (user-added information) transmitted thereto from the HDD recorder 4.

A marking information acquisition section 242 acquires marking information supplied thereto from the HDD recorder 4, recognizes the acquired marking information and supplies the information of the broadcast date and time and the broadcast station information of the marking to a search engine 243. Further, the marking information acquisition section 242 supplies, in addition to the information of the broadcast date and time and the broadcast station information of the marking, user-added information added to the marking information, that is, information of restriction conditions designated by the user upon production of navigation information, to a personalized navigation information production section 241.

The search engine 243 searches for and reads out information of a scene of a corresponding broadcast program from the broadcast date and time and the broadcast station information supplied thereto in a coordinated relationship with the URI from within a program scene information DB 244 and supplies the information to a browser section 245. The program scene information DB 244 is recorded as a database in which images (including sound information) corresponding to scenes of programs broadcast in broadcast programs and URIs multiplexed in vertical blanking periods upon broadcasting are coordinated with each other.

In particular, the search engine 243 reads out, for example, where a broadcast program is a travel program or the like, a scene at a timing of marking by the user while the broadcast program is watched and the URI of an HP relating to a place introduced in the broadcast program from the program scene information DB 244 and supplies the read out scene and URI to the browser section 245.

The browser section 245 reads out the URI supplied thereto from the search engine 243 and accesses the read out URI to download a predetermined HP from the server not shown. Then, the browser section 245 supplies a result of the downloading to an extraction section 246.

The extraction section 246 extracts the information supplied thereto from the browser section 245 and representing the predetermined HP, that is, information representative of a position such as, for example, an address or a telephone number from the text information and supplies the extracted information to a position information production section 247. More particularly, the information representative of a position from the extraction section 246 may be, for example, text characters extracted and displayed so as to allow selection of the user or may utilize a search function. For example, where a character string of an address is extracted using a search function, the extraction section 246 searches for a keyword representative of an address such as "prefecture", "city" or "town" and decides and extracts character strings preceding and following the searched out keyword as those representing an address.

Further, the extraction section 246 searches, as a character string of a telephone number, such a keyword as "telephone" or "TEL" and decides and extracts a character string following the keywords as a telephone number. Furthermore, the extraction section 246 searches for a character string of a particular pattern such as "03-" or "048-" and decides and extracts the character string as part of a telephone number.

The position information production section 247 uses the information representative of a position such as an address or a telephone number supplied thereto from the extraction section 246 to search for and read out information of a corresponding latitude and altitude from a position database 248 to produce position information and supplies the position information to the personalized navigation information production section 241. In particular, a database wherein addresses and/or telephone numbers are coordinated with pieces of position information each including information of a latitude and an altitude is recorded in the position database 248. Thus, the position information production section 247 searches for position information including a corresponding latitude and altitude based on an address or a telephone number supplied thereto from the extraction section 246 and supplies the searched out position information to the personalized navigation information production section 241.

The personalized navigation information production section 241 definitely decides a turn (broadcast date) at which the broadcast program was broadcast based on broadcast date and time marked by the navigator DB 232 and reads out corresponding program-aimed basic navigation information 233. Further, a filtering processing section 241a of the personalized navigation information production section 241 filters points existing in sections included in the read out program-aimed basic navigation information 233 with reference to restriction conditions based on user-added conditions added to the marking information. Meanwhile, an information addition section 241b of the personalized navigation information production section 241 performs a search to decide whether or not a point in the proximity of any of the points included in a plurality of sections set based on the filtered information is included in a point history information DB 249. If a point of personalized navigation information produced in the past is in the proximity of a point of navigation information being currently produced, then the information addition section 241b adds the point as a point of the personalized navigation information.

In particular, navigation information produced in the past for each user is accumulated as history points 261-1 to 261-m in a coordinated relationship with position information (a latitude and an altitude) in the point history information DB 249. Therefore, the information addition section 241b of the personalized navigation information production section 241 compares the positions of points of personalized navigation information being currently produced with the positions of the history points 261-1 to 261-m. Then, if a position which is within a predetermined distance is detected, then the information addition section 241b adds the point as a point 406 of route information 405 (FIG. 14) of the personalized navigation information being currently produced to the personalized navigation information being currently produced.

Further, the information addition section 241b of the personalized navigation information production section 241 performs a search of information recorded in an associate shop information (coupon information) DB 250 to decide whether or not an associate shop which provides a coupon is present in the proximity of any of the points included in the personalized navigation information filtered and having history points added thereto. If such an associate shop which provides a coupon is present, then the information addition section 241b adds the position of the shop as a point of the navigation information and adds the coupon information as well.

Further, the information addition section 241b of the personalized navigation information production section 241 adds position information extracted based on marking information supplied thereto from the position information production section 247 as a point to the navigation information.

Finally, the personalized navigation information production section 241 produces, based on the navigation information produced by such various processes as described above, data recognizable by the car navigation apparatus 11 for executing a route guidance conforming to the interest and the liking of the user, that is, personalized navigation information.

In short, the personalized navigation information production section 241 performs, on the basis of basic navigation information based on a broadcast program, filtering based on a restriction condition, addition of a history point, addition of a shop based on associate shop information and coupon information and addition of information of a point searched out with marking information to selectively extract a point conforming to the interest and the liking of the user who enjoyed the broadcast program to produce navigation information.

Figure 7:
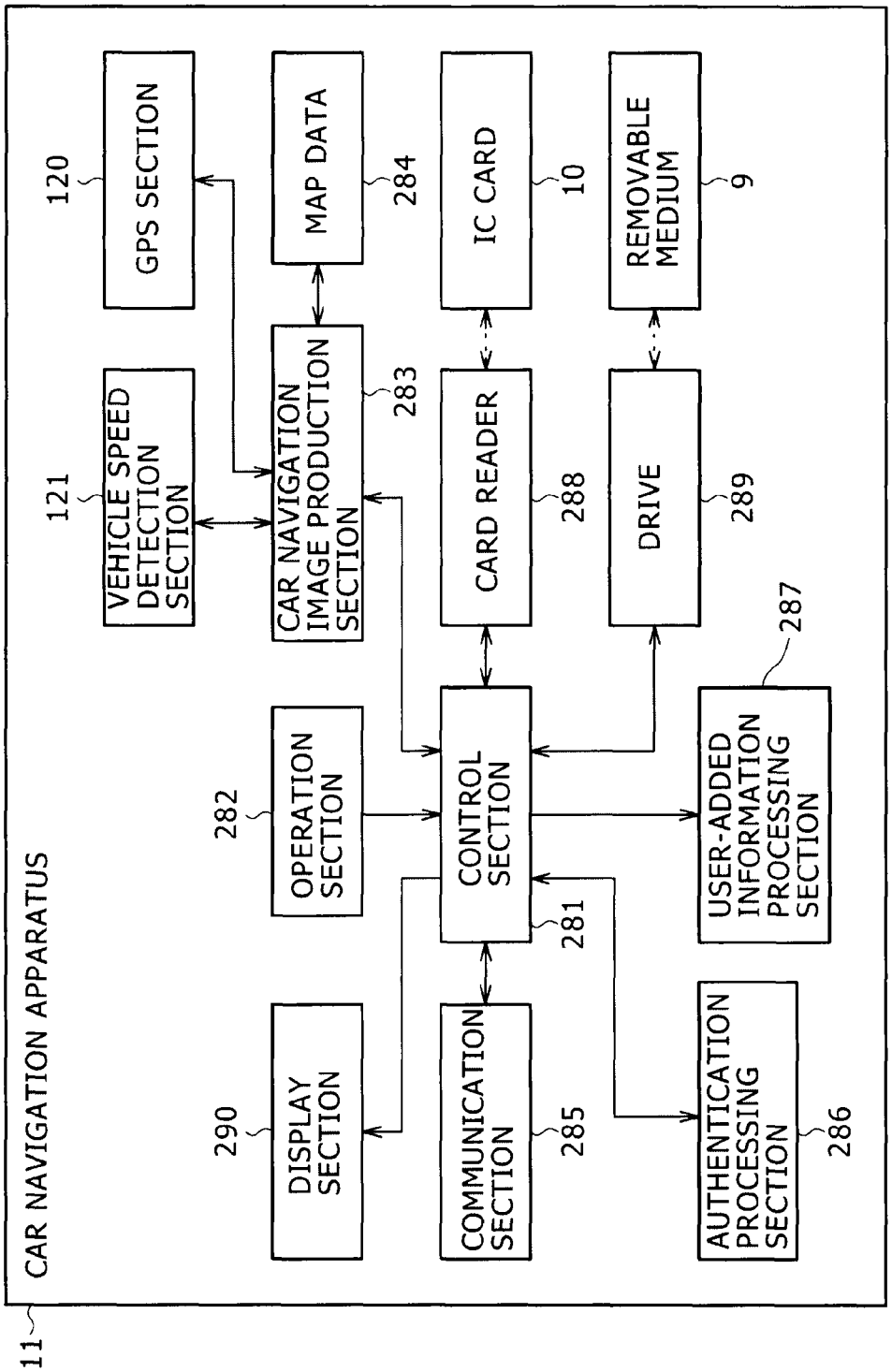
FIG. 7 is a block diagram illustrating functions implemented by the car navigation apparatus shown in FIG. 1.

Now, functions implemented by the car navigation apparatus 11 are described with reference to FIG. 7.

A control section 281 controls operation of the entire car navigation apparatus 11.

Figure 4:
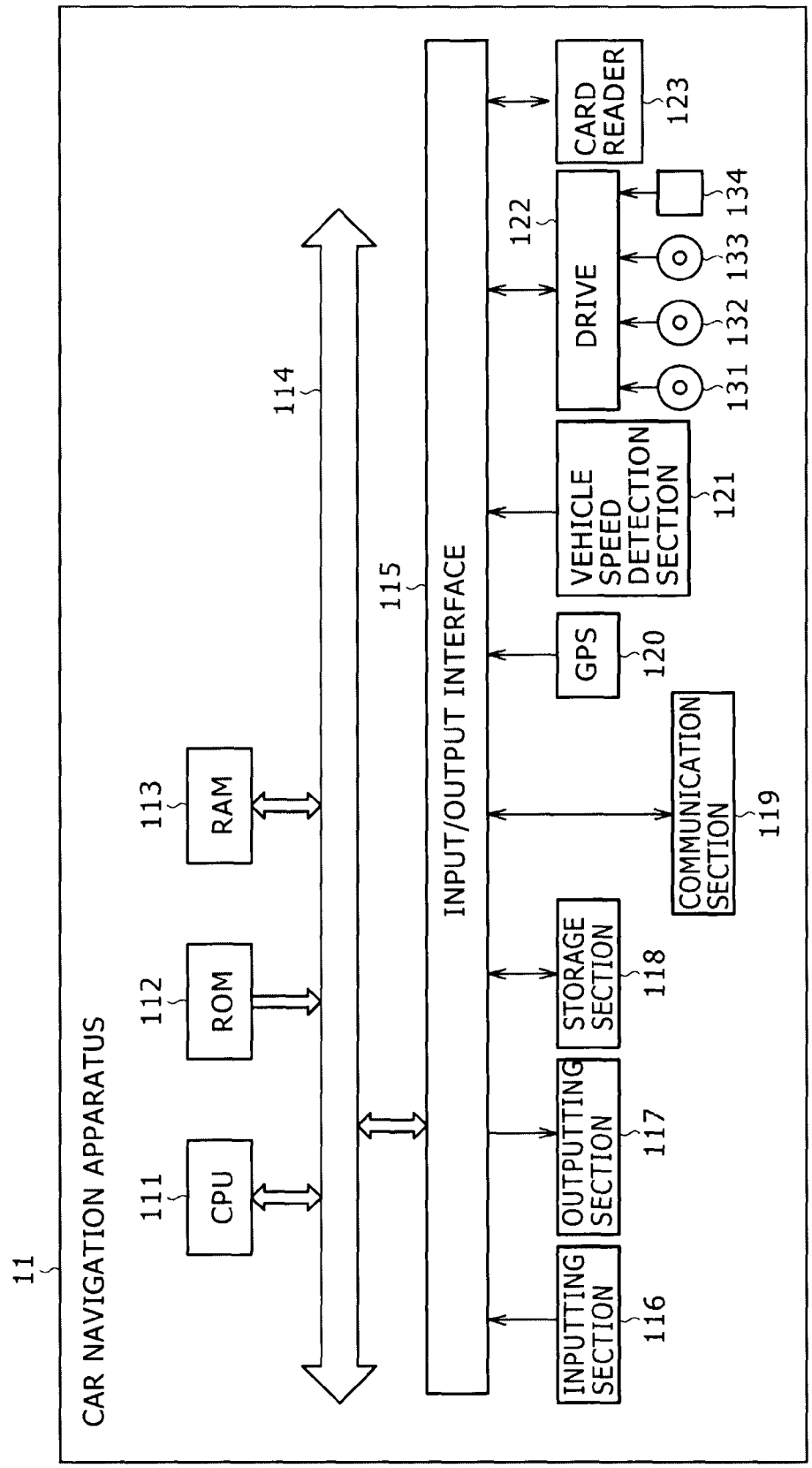
FIG. 4 is a block diagram showing a configuration of a car navigation apparatus shown in FIG. 1.

An operation section 282 corresponds to the inputting section 116 shown in FIG. 4. The operation section 282 is operated by the user to input a command indicative of a desired action to the car navigation apparatus 11 and generates and supplies a signal representative of contents of the operation to the control section 281.

A drive 289 reads out, if a removable medium 9 is loaded therein, information recorded on the removable medium 9 under the control of the control section 281 and supplies the information to the control section 281. If the removable medium 9 has navigation information recorded thereon by the HDD recorder 4, then the drive 289 reads out and supplies the navigation information to the control section 281. The control section 281 supplies the navigation information supplied thereto to a car navigation image production section 283.

The car navigation image production section 283 produces a car navigation image based on navigation information supplied from the control section 281, a vehicle speed signal supplied from the vehicle speed detection section 121, position information supplied from the GPS section 120 and map data 284 and causes a display section 290 to display the car navigation image.

A communication section 285 accesses the program-interlocked web server 8 or the settlement server 12 through a network such as the Internet 7 under the control of the control section 281 to transmit and receive various data.

An authentication processing section 286 and a user-added information processing section 287 are similar to the authentication processing section 203 and the user-added information production section 204 shown in FIG. 5, respectively. In particular, also the car navigation apparatus 11 can access the program-interlocked web server 8 similarly to the HDD recorder 4 to issue a request for production of navigation information. In this instance, however, the production of navigation information is performed by addition of a restriction condition of user-added information to the navigation information recorded on the removable medium 9. Accordingly, a settlement process involved in the production of navigation information is performed using the IC card 10 loaded in a card reader 288.

Figure 8:
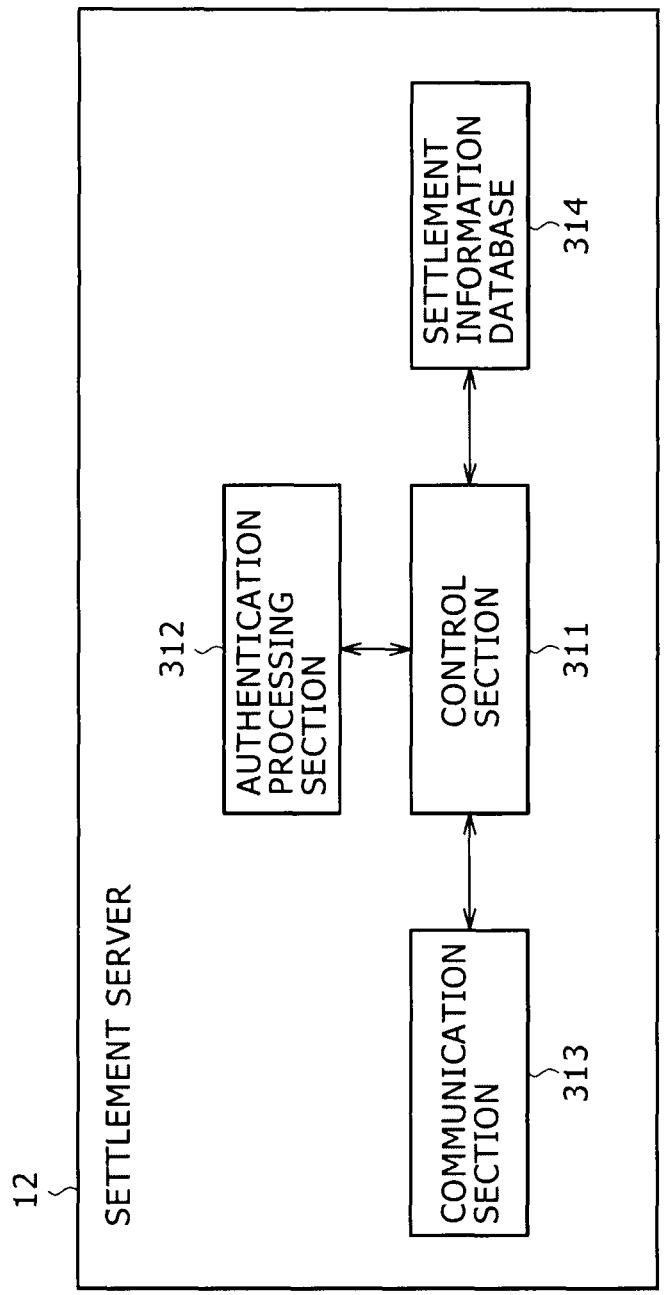
FIG. 8 is a block diagram illustrating functions implemented by a settlement server shown in FIG. 1.

Now, a configuration of the settlement server 12 is described with reference to FIG. 8.

A control section 311 controls action of the entire settlement server 12. A communication section 313 accesses the HDD recorder 4, program-interlocked web server 8 or shop terminal 13 through a network such as the Internet 7 under the control of the control section 311 to transmit and receive various data.

An authentication processing section 312 executes, when a settlement process for a charge of a consideration for a service is to be executed, an authentication process together with an apparatus from which a request for such settlement is issued (a user who operates the apparatus). If the authentication results in success, then the control section 311 updates information of a credit card or a bank account of the user recorded in a settlement information database 314 to execute a settlement process.

Figure 9:
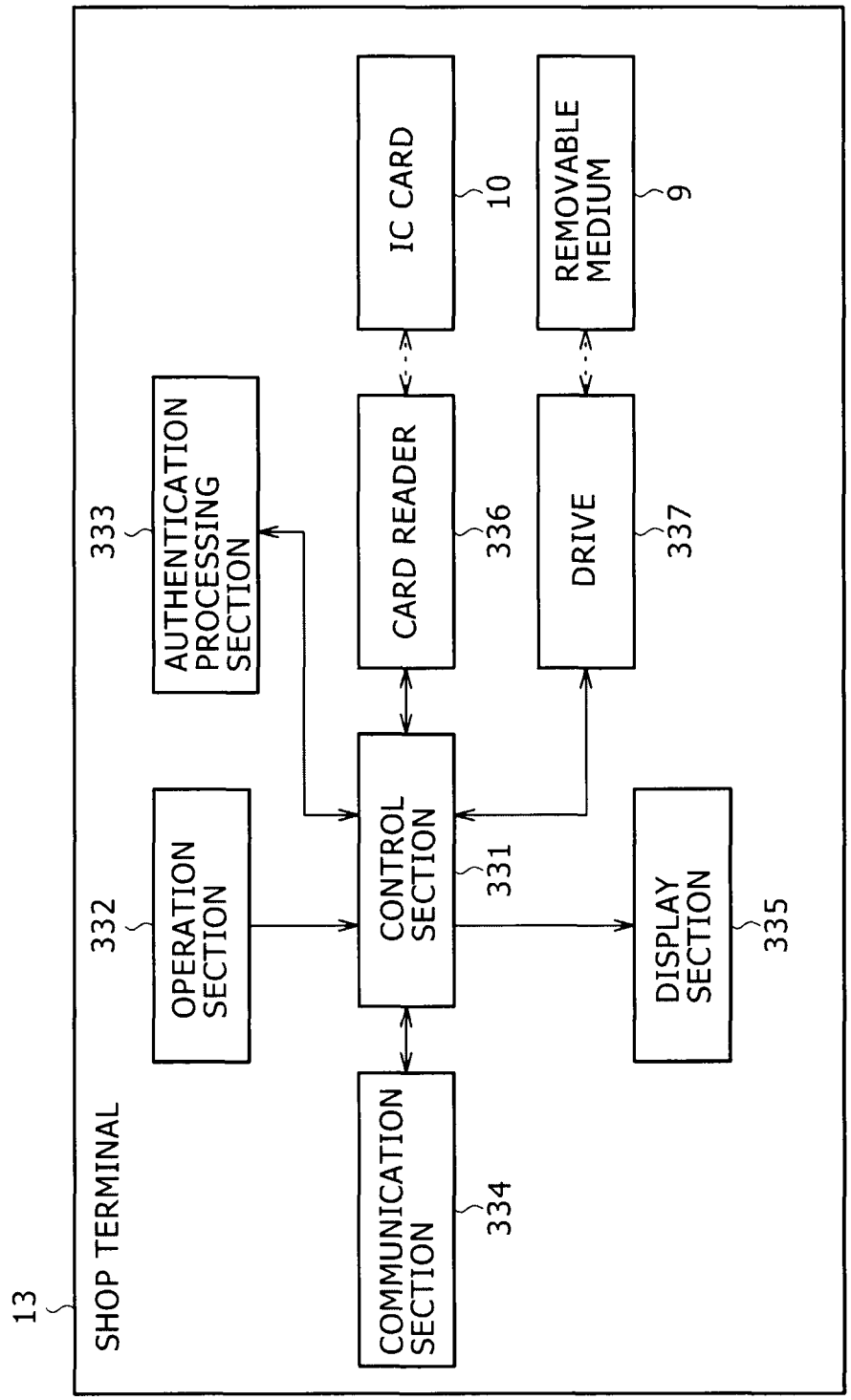
FIG. 9 is a block diagram illustrating functions implemented by a shop terminal shown in FIG. 1.

Now, functions implemented by the shop terminal 13 are described with reference to FIG. 9.

A control section 331 of the shop terminal 13 controls action of the entire shop terminal 13.

An operation section 332 corresponds to the inputting section 76 and is operated by an employee of the shop when the IC card 10 is utilized in a settlement process for a charge when the user purchases a commodity or enjoys a service.

A control section card reader 336 reads out and supplies data recorded in the IC card 10 loaded therein to the control section 331 under the control of the control section 331. Further, the control section card reader 336 records data designated by the control section 331 into the IC card 10. An authentication processing section 333 executes a settlement process after it executes an authentication process together with the settlement server 12 through a communication section 334 and records a result of the settlement process into the IC card 10. Further, a display section 335 displays the result of the settlement process and so forth.

Further, a drive 337 reads out data recorded in a removable medium 9 loaded therein under the control of the control section 331 and supplies the read out data to the control section 331. Further, the drive 337 records data designated by the control section 331 into the removable medium 9.

Now, a program transmission/reception process by the broadcast station 1 and the HDD recorder 4 is described with reference to a flow chart of FIG. 10. It is assumed that, in the following description, the broadcast program is a travel program and a server not shown in which information of an HP relating to a point such as a place introduced in the travel program is recorded exists at an address on the Internet 7 designated by a URI.

At step S1, the broadcast station 1 reads out program information. In particular, the broadcast station 1 reads out program information formed from image data and sound data which construct the program.

At step S2, the broadcast station 1 multiplexes information of the URI into vertical blanking periods when it transmits the read out program information.

At step S3, the broadcast station 1 broadcasts the broadcast program having the URI placed in the vertical blanking periods thereof through the antenna 2.

At step S11, the HDD recorder 4 receives the program. In particular, the control section 201 sets the tuner 210 to a state wherein it can receive a radio wave of a frequency corresponding to a channel set by an operation of the remote controller 5 and controls the tuner 210 to receive the program information broadcast from the broadcast station 1 through the antenna 3. Then, the HDD recorder 4 converts the received broadcast signal into a predetermined image signal and supplies the image signal to the television receiver 6 through the outputting section 211 so that the image signal is displayed on the television receiver 6. Further, the HDD recorder 4 supplies the image signal also to the image recording section 212.

At step S12, the image recording section 212 records the broadcast program supplied thereto from the tuner 210.

At step S13, the control section 201 decides whether or not the remote controller 5 is operated and a signal of a marking instruction is received by the light receiving section 207. For example, if the user operates, while watching a place introduced in the travel program displayed on the television receiver 6, the remote controller 5 at a timing at which a scene in which the user is interested or a scene which the user wants to incorporate into a point of navigation data is displayed to issue a marking instruction, then it is decided that a marking instruction is issued. Then, the processing advances to step S14.

At step S14, the control section 201 controls the marking information recording section 208 to update the marking information. More particularly, the marking information recording section 208 records the time information outputted from the RTC 209 as broadcast date and time of the timing at which the marking instruction is issued in accordance with an instruction from the control section 201. Further, the marking information recording section 208 combines the time information with the broadcast station information to produce marking information and stores the marking information.

At step S15, the control section 201 controls the tuner 210 to decide whether or not the broadcast comes to an end. If it is decided that the broadcast does not come to an end, then the processing returns to step S11 so that the processes at the steps beginning with step S11 are repeated.

At step S4, the broadcast station 1 decides whether or not the broadcast comes to an end. If the broadcast does not come to an end as yet, then the processing returns to step S1 so that the processes at the steps beginning with step S1 are repeated. Then, if it is decided at step S4 that the broadcast comes to an end, then the transmission process of the broadcast program by the broadcast station 1 is ended.

Also at step S15, it is decided similarly that the broadcast comes to an end, and consequently, the reception process of the broadcast program by the HDD recorder 4 is ended.

If it is decided at step S13 that a marking instruction is not issued, then the process at step S14 is skipped. In other words, the marking information is not updated.

By the process described above, information of the broadcast date and time and the broadcast station information when a scene in which the user is interested is broadcast while the user watches a broadcast program being broadcast are successively accumulated to produce marking information. It is to be noted that, although, in the example described above, the process described above is executed while a broadcast program is being broadcast, also it is possible to otherwise reproduce a recorded broadcast program at time different from the time at which the broadcast program was broadcast at step S12 and then repeat the processes at steps S13 and S14 to produce marking information. When marking information is produced while a recorded broadcast program is being reproduced, the marking information recording section 208 extracts the broadcast station information and the broadcast starting date and time of the broadcast program, for example, from within attribute information added to the recorded broadcast program and arithmetically operates the broadcast date and time from reproduction time (time code) when the marking instruction is issued, and then records the broadcast date and time and the broadcast station information as marking information in accordance with an instruction from the control section 201. Or, the marking information produced during broadcasting of the broadcast program or during reproduction of the recorded broadcast program may be updated repetitively while the reproduced broadcast program is enjoyed again. In this instance, marking set once may naturally be deleted.

Now, a process of a production service of personalized navigation information (process of a personalized navigation information production service) is described with reference to a flow chart of FIG. 11.

At step S51, the control section 201 controls the drive 205 to decide whether or not a removable medium 9 on which marking information is recorded is loaded and a signal for requesting for production of personalized navigation information is received from the light receiving section 207. The process just described is repeated until after a removable medium 9 is loaded into the drive 205 and a request for production of personalized navigation information (navigation information conforming to the interest or the liking of the user) is issued.

For example, if a removable medium 9 on which marking information is recorded is loaded into the drive 205 and the remote controller 5 is operated, then the processing advances to step S52.

At step S52, the control section 201 controls the drive 205 to read out the marking information recorded on the removable medium 9 loaded in the drive 205. Further, the control section 201 controls the image recording section 212 based on the marking information to produce thumbnail images each formed from an image at corresponding broadcast date and time and outputs the thumbnail images from the outputting section 211 so that they are displayed on the television receiver 6.

At step S53, the control section 201 issues an inquiry to the light receiving section 207 to decide whether or not the remote controller 5 is operated to change the marking information. If it is decided at step S53 that the marking information is changed, that is, in such a case that information of marking displayed as a thumbnail is deleted or added, the control section 201 controls the marking information recording section 208 at step S54 to update the marking information recorded in the removable medium 9, that is, the information of the broadcast date and time and the broadcast station information of the broadcast program at the timing of the marking.

On the other hand, if the marking is not changed at step S53, then the process at step S54 is skipped.

At step S55, the control section 201 controls the light receiving section 207 to decide whether or not the remote controller 5 is operated to input a restriction condition by user added information. The control section 201 decides whether or not a restriction condition formed from user added information such as, for example, information of the starting place or the destination or schedule information of the starting date and time and the arriving date and time (or the morning, daytime, evening or night) is inputted separately.

If it is decided at step S55 that a restriction condition is inputted, then the control section 201 controls the user-added information production section 204 at step S56 to produce user added information inputted by an operation of the remote controller 5 and making a restriction condition and add the user added information to the marking information recorded in the removable medium 9.

On the other hand, if a restriction condition, that is, user added information, is not inputted at step S55, then the process at step S56 is skipped.

At step S57, the control section 201 controls the light receiving section 207 to decide whether or not the remote controller 5 is operated to issue an instruction to finally decide the marking information. If a final decision instruction is not issued, then the processing returns to step S53 so that the processes at steps S53 to S57 are repeated until after a final decision instruction is issued.

If the remote controller 5 is operated and it is decided that the marking information is finally decided at step S57, then the control section 201 controls the communication section 202 at step S58 to transmit the marking information to the program-interlocked web server 8 and issue a request for production of personalized navigation information.

At step S71, the control section 231 of the program-interlocked web server 8 controls the communication section 234 to decide whether or not a request for production of personalized navigation information is received from the HDD recorder 4. The process is repeated until after a request for production of personalized navigation information is received. For example, if a request for production of personalized navigation information is received as a result of the process at step S57, then the processing advances to step S72.

At step S72, the control section 231 controls the communication section 234 to acquire the marking information transmitted from the HDD recorder 4. At step S73, the control section 231 controls the communication section 234 to send information of a charge for the production service of personalized navigation information to the HDD recorder 4 and issue a request for a settlement process of the utilization charge to the HDD recorder 4.

At step S59, the control section 201 of the HDD recorder 4 cooperates with the settlement server 12 through the communication section 202 to execute a settlement process based on the request for a settlement process.

Figure 12:
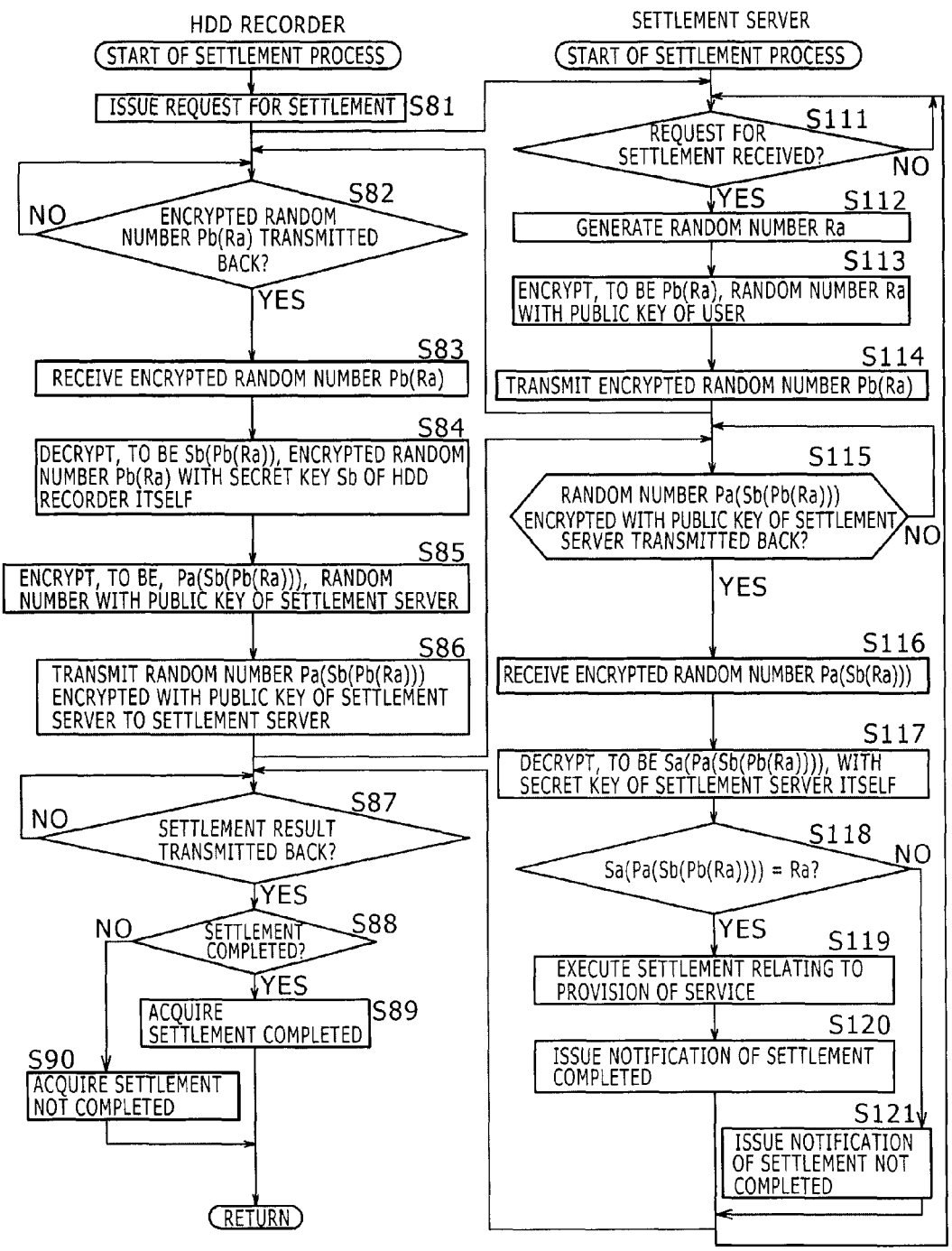
FIG. 12 is a flow chart illustrating a settlement process.

Here, the settlement process is described with reference to a flow chart of FIG. 12.

At step S81, the control section 201 of the HDD recorder 4 controls the communication section 202 to issue a request for a settlement process for the utilization charge for the production of personalized navigation information to the settlement server 12. At this time, the control section 201 controls the card reader 206 to additionally transmit an ID of the IC card and information of the user to the settlement server 12.

At step S111, the control section 311 of the settlement server 12 controls the communication section 313 to decide whether or not a request for a settlement process is received. Thus, the process is repeated until after a request for a settlement process is received. For example, if a request for a settlement process of a charge for a production service of personalized navigation information is issued as a result of the process at step S81, then the control section 311 controls the authentication processing section 312 at step S112 to generate a random number Ra based on the ID of the IC card and/or the user information transmitted together with the request for a settlement process.

At step S113, the control section 311 controls the authentication processing section 312 to encrypt, to be (Pb(Ra)) the random number Ra with a public key Pb of the user. Further, at step S114, the control section 311 controls the communication section 313 to transmit the encrypted random number Pb(Ra) to the HDD recorder 4.

At step S82, the control section 201 of the HDD recorder 4 controls the communication section 202 to decide whether not an encrypted random number Pb(Ra) is transmitted to the HDD recorder 4. Thus, the process is repeated until after an encrypted random number Pb(Ra) is transmitted to the HDD recorder 4. For example, in such a case that an encrypted random number Pb(Ra) is transmitted as a result of the process at step S114, the control section 201 receives the random number Pb(Ra) transmitted thereto at step S83.

At step S84, the control section 201 reads out a secret key Sb recorded in the IC card 10 and supplies the secret key Sb to the authentication processing section 203 so that the authentication processing section 203 decrypts, to be Sb(Pb(Ra)) the received encrypted random number Pb(Ra) with the secret key Sb of the authentication processing section 203 thereof. In particular, if the public key of the HDD recorder 4 used for the encryption of the random number Ra corresponds to the secret key Sb used for the decryption at this stage, this signifies that the random number Sb(Pb(Ra)) decrypted with the secrete key of the authentication processing section 203 itself is same as the original random number Ra.

At step S85, the control section 201 controls the authentication processing section 203 to encrypt, to be Pa(Sb(Pb (Ra)), the random number Sb(Pb(Ra)) decrypted with the secret key thereof with a public key Pa of the settlement server 12.

At step S86, the control section 201 controls the communication section 202 to transmit the random number Pa(Sb (Pb(Ra))) encrypted with the public key Pa of the settlement server 12 to the settlement server 12.

At step S115, the control section 231 controls the communication section 234 to decide whether or not the random number Pa(Sb(Pb(Ra))) encrypted with the public key Pa of the settlement server 12 is transmitted from the settlement server 12. The process is repeated until after a random number Pa(Sb(Pb(Ra))) is transmitted from the settlement server 12. For example, if the random number Pa(Sb(Pb(Ra))) encrypted with the public key Pa of the settlement server 12 is transmitted from the settlement server 12 as a result of the process at step S86, then the processing advances to step S116.

At step S116, the control section 311 controls the communication section 313 to receive the random number Pa(Sb(Pb (Ra))) encrypted with the public key Pa of the settlement server 12 transmitted from the settlement server 12. At step S117, the control section 311 controls the authentication processing section 312 to decrypt, to be Sa(Pa(Sb(Pb(Ra)))), the random number Pa(Sb(Pb(Ra))) encrypted with the public key Pa of the settlement server 12 transmitted from the settlement server 12 with a secret key Sa of the control section 311 itself.

At step S118, the control section 311 controls the authentication processing section 312 to decide whether or not the random number Ra produced by the process at step S112 and the random number Sa(Pa(Sb(Pb(Ra)))) decrypted with the secret key Sa of the control section 311 itself coincide with each other. In particular, if the random number Sb(Pb(Ra)) decrypted with the secret key of the control section 311 itself is same as the original random number Ra at the stage of the process at step S84, then the random number Pa(Sb(Pb(Ra))) encrypted with the public key of the settlement server 12 transmitted from the settlement server 12 should be Pa(Ra). Further, if the public key Pa of the settlement server 12 and the secret key Sa correspond to each other, then the random number decrypted with the secret key Sa of the settlement server 12 is same as the original random number Ra, and as a result, it is decided that the authentication is successful, that is, the user is a user who owns the legal IC card 10.

Thus, if the random number Ra produced by the process at step S112 and the random number Sa(Pa(Sb(Pb(Ra)))) decrypted with the secret key of the control section 311 itself coincide with each other, then it is decided that the authentication is successful. Then at step S119, the control section 311 update the information of the settlement information database 314 and transfers a charge for the production service of personalized navigation information from an account of a credit card or an account of a bank of the user to an account of a trader who produces the personalized navigation information.

At step S120, the control section 311 controls the communication section 313 to transmit a notification of settlement completed representing that the settlement process of the HDD recorder 4 is completed. Thereafter, the processing returns to step S111.

On the other hand, if the random number Ra produced by the process at step S112 and the random number Sa(Pa(Sb (Pb(Ra)))) decrypted with the secret key of the control section 311 itself do not coincide with each other, then it is decided that the IC card 10 is not a legal one, or not registered. Thus, at step S121, the control section 311 stops the settlement process and controls the communication section 313 to issue a notification that the settlement process is not completed to the HDD recorder 4. Thereafter, the processing returns to step S111.

At step S87, the control section 201 decides whether or not a result of settlement is transmitted from the settlement server 12. For example, if a settlement result is transmitted from the settlement server 12 by the processes at step S120 or S121, then the processing advances to step S88.

At step S88, the control section 201 decides whether or not the settlement result received is a notification which indicates settlement completed, that is, indicates that a settlement process is completed. Then, if a notification that a settlement process is completed is transmitted by the process at step S120, then the control section 201 controls the communication section 202 to acquire the notification of settlement completed indicating completion of the settlement process at step S89.

On the other hand, if a notification of settlement not completed indicating that a settlement process is not completed is transmitted by the process at step S121, then the control section 201 acquires a notification of settlement not completed at step S90.

By the process described above, a settlement process for a utilization charge for a service is executed only when the user having a legal IC card 10 is authenticated and utilizes the legal IC card. It is to be noted that the notification of settlement completed indicates, for example, that it is issued legally by the settlement server 12. For example, an electronic watermark may be placed in the notification.

Referring back to the flow chart of FIG. 11, at step S60, the control section 201 controls the communication section 202 to transmit the process result of the settlement process described above to the program-interlocked web server 8.

At step S74, the control section 231 of the program-interlocked web server 8 controls the communication section 234 to decide whether or not the settlement process result transmitted from the HDD recorder 4 indicates settlement completed. For example, if a notification of settlement completed is received by the process at step S89 in the flow chart of FIG. 12, then the control section 231 supplies acquired marking information to the personalization engine 8a and controls the personalization engine 8a to execute a personalized navigation information production process at step S75.

The personalized navigation information production process is described with reference to a flow chart of FIG. 13.

At step S131, the marking information acquisition section 242 acquires the marking information supplied from the HDD recorder 4, recognizes the acquired marking information and supplies information of broadcast date and time and the broadcast station of the marking to the communication section 234. Further, the marking information acquisition section 242 supplies, in addition to the information of broadcast date and time and the broadcast station of the marking, user added information added to the marking information, that is, information of a restriction condition designated by the user upon production of the navigation data, to the personalized navigation information production section 241.

At step S132, the personalized navigation information production section 241 acquires, from among the program-aimed basic navigation information 233-1 to 233-o stored in the navigation data DB 232, the basic navigation information 233 which corresponds to the broadcast date and time and the broadcast station of the marking.

Figure 14:
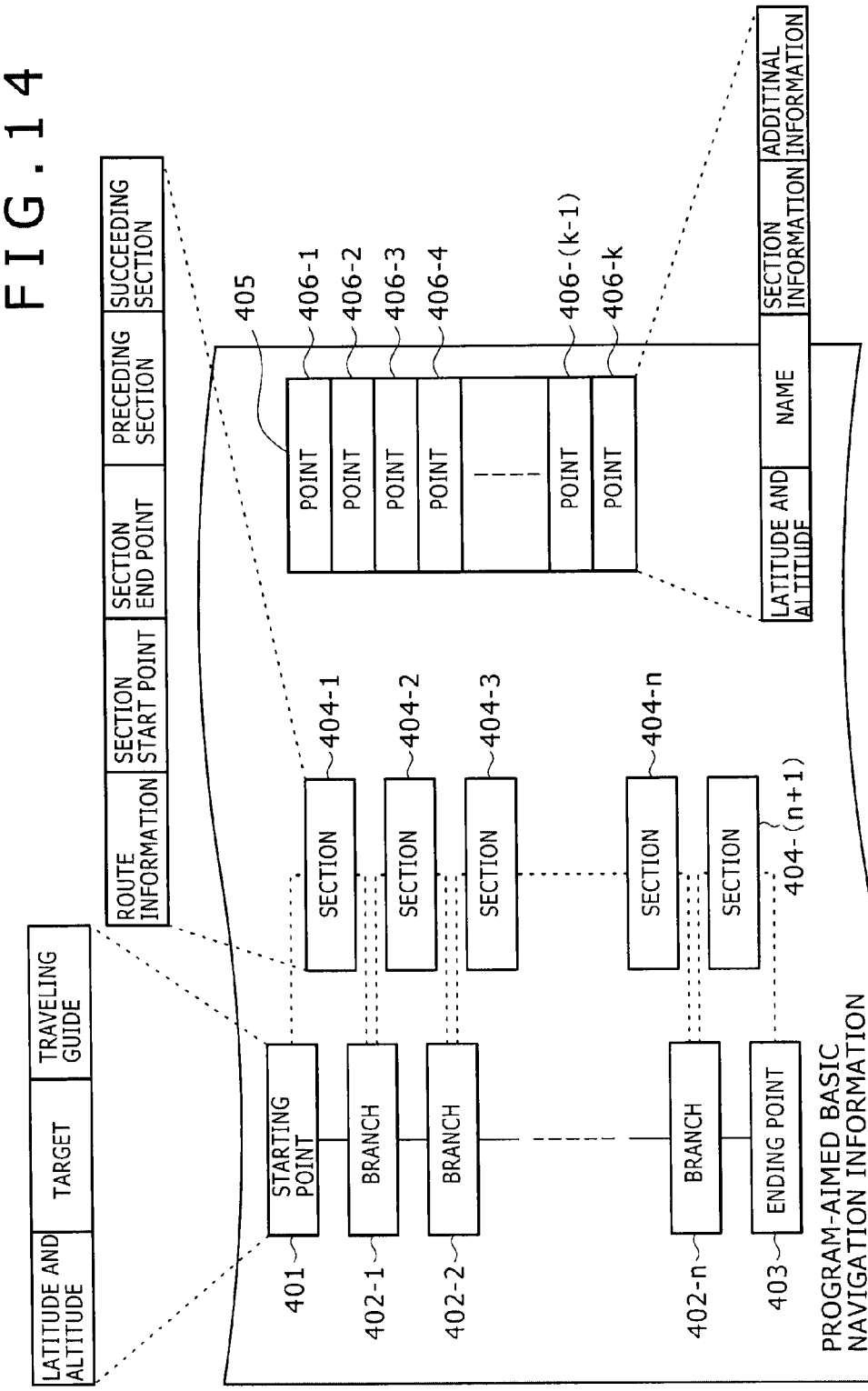
FIG. 14 is a diagrammatic view illustrating program-aimed basic navigation information.

Now, the structure of the program-aimed basic navigation information 233 is described with reference to FIG. 14.

The program-aimed basic navigation information 233 includes route information including starting point information 401, branch information 402-1 to 402-n, ending point information 403 and section information 404-1 to 404-(n+1), and route information 405 including point information 406-1 to 406-k of points existing at positions along the route.

The route information is information from a starting point to an ending point through a plurality of branches and is information for causing a route which is guided by each broadcast program to be actually guided by the car navigation apparatus 11. The starting point information 401 includes information of the latitude and the altitude of a position which makes the starting point, a target at the position of the starting point and information of a traveling guide when the automobile travels at the position of the starting point.

The branch information 402-1 to 402-n and the ending point information 403 have a configuration similar to that of the starting point information, and overlapping description of the configuration is omitted herein to avoid redundancy. Further, the section information 404-1 to 404-(n+1) is recorded between the starting point and a branch, between each branch and another branch and between a branch and the ending point. The section information 404 includes information of route information, a section start point, a section end point, a preceding section and a succeeding section recorded therein.

Further, each point 406 of the route information 405 includes the latitude and the altitude, which is information representative of the position of the point, the name of the point, section information for identifying the section information 404 in which the point exists, and additional information recorded therein. The additional information here is a classification item of restriction, for example, information of the date and time, object and so forth.

The program-aimed basic navigation information 233 includes the starting point information 401, branch information 402-1 to 402-n and ending point information 403 so that they may be arranged basically in the order as guided by the broadcast program. Therefore, if a restriction condition is not designated specifically by the user, then the program-aimed basic navigation information 233 is produced as it is as personalized navigation information.

Further, the point information 406-1 to 406-k of the route information 405 is information of the positions existing on the route and are each guided when the point is approached when the car navigation apparatus 11 reads in the produced navigation data to perform a route guidance.

Figure 13:
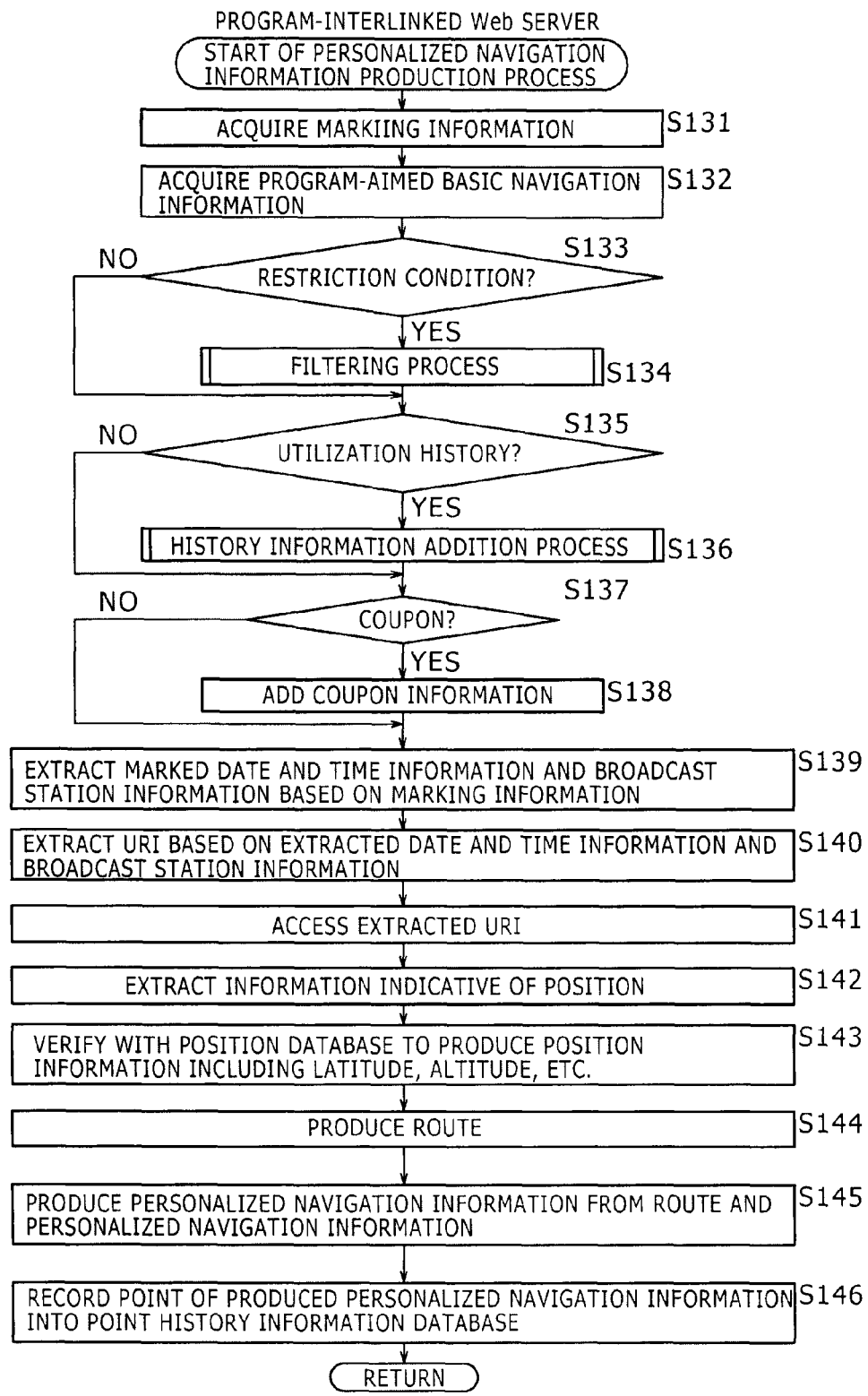
FIG. 13 is a flow chart illustrating a personalized navigation information production process.

Referring back to the flow chart of FIG. 13, at step S133, the filtering processing section 241a decides whether or not the marking information has user added information, that is, a restriction condition, added thereto. For example, if it is decided at step S133 that user added information, that is, a restriction condition, is added, then the filtering processing section 241a executes a filtering process at step S134.

Figure 15:
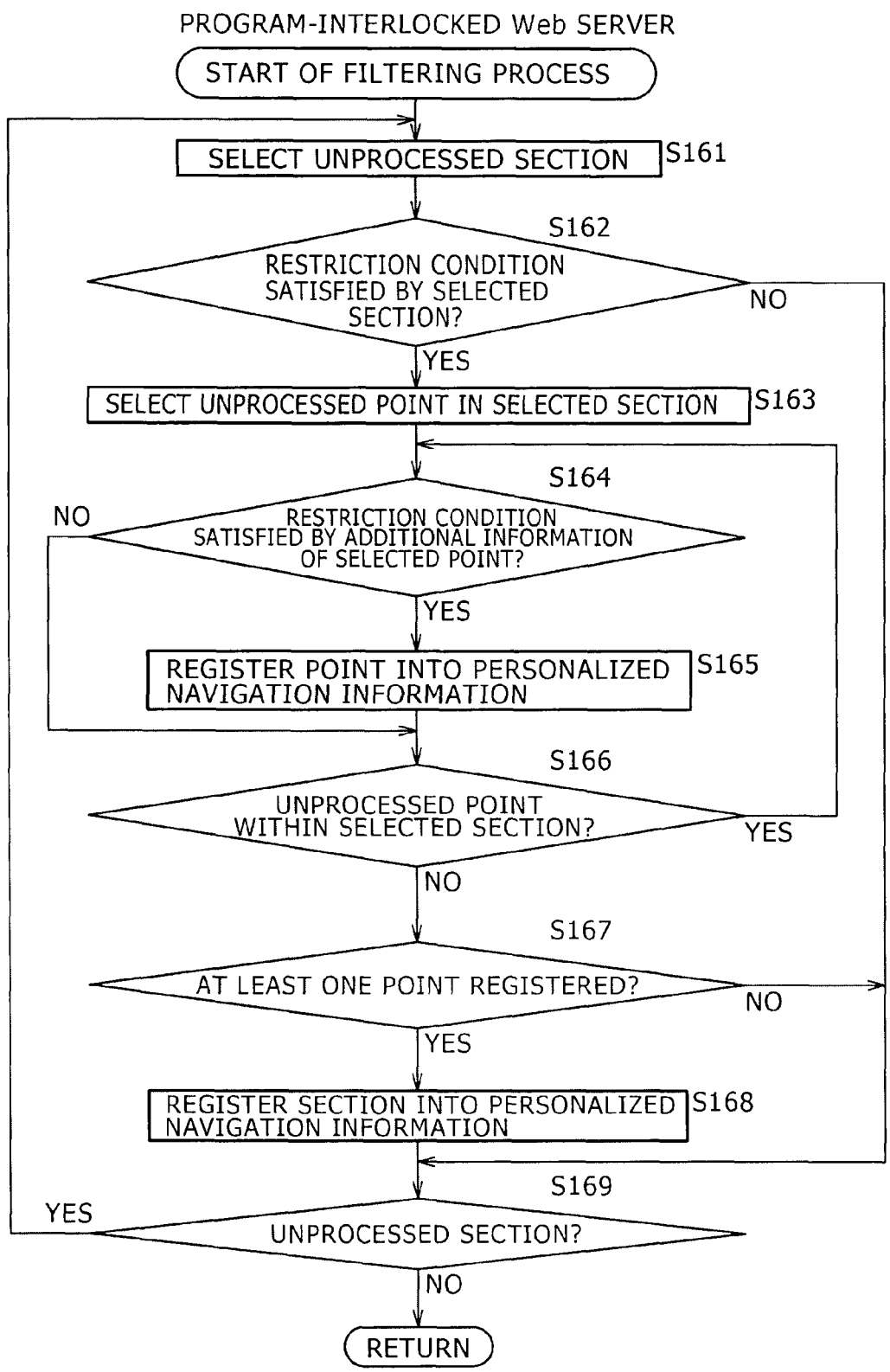
FIG. 15 is a flow chart illustrating a filtering process.

Here, the filtering process is described with reference to a flow chart of FIG. 15.

At step S161, the filtering processing section 241a selects unprocessed section information from within the program-aimed basic navigation information.

At step S162, the filtering processing section 241a decides whether or not the selected section satisfies the restriction condition. In particular, since the restriction condition sometimes includes setting of a starting point and an ending point, it is decided whether or not the selected section information satisfies the restriction condition. More particularly, while, in the program-aimed basic navigation information, the starting point is set by the starting point information 401 and the ending point is set by the ending point information 403, for example, if the restriction condition is provided such that the branch 402-1 is set as the starting point and the branch 402-n is set as the ending point as seen in FIG. 14, then the section information 404-1 to 404-(n+1) does not satisfy the restriction condition. Therefore, in this instance, the following process is not performed, and the processing advances directly to step S169.

On the other hand, if it is decided at step S162 that the selected section information satisfies the restriction condition, then the filtering processing section 241a selects an unprocessed point in the selected section at step S163. In particular, the filtering processing section 241a selects one of those points 406 which correspond to the currently selected section based on the section information of the points of the route information 405.

At step S164, the filtering processing section 241a reads out the additional information of the selected point 406 and decides whether or not the additional information satisfies the restriction condition. In particular, for example, if "couple" is designated as the object in the restriction condition, then it is decided whether or not the item of the object in the additional information included in the point 406 is "couple". If this condition is satisfied, then the processing advances to step S165.

At step S165, the filtering processing section 241a registers the selected point 406 as a point of the personalized navigation information.

On the other hand, if it is decided at step S164 that the additional information of the selected point does not satisfy the restriction condition, then the filtering processing section 241a decides that the information is not desired by the user, and deletes the selected point 406 from the personalized navigation information.

At step S166, the filtering processing section 241a decides whether or not an unprocessed point exists in the selected section. If it is decided that an unprocessed point exists, then the processing returns to step S164. In other words, as far as an unprocessed point exists, the processes at steps S164 to S166 are repeated. Then, if it is decided at step S166 that an unprocessed point does not exist in the selected section, then the processing advances to step S167.

At step S167, the filtering processing section 241a decides whether or not at least one point selected as the personalized navigation information exists in the selected section. For example, if at least one point selected as the personalized navigation information exists in the selected section, then the filtering processing section 241a registers the selected section information into the personalized navigation information at step S168. Since that at least one point registered exists signifies that a point which satisfies the restriction condition in which the user is interested exits, the section information is set so as to be included in the route up to the destination.

On the other hand, if it is decided at step S167 that no point registered exists, then since the selected section does not include a point in which the user is interested, the process at step S168 is skipped and the selected section information is deleted from the personalized navigation information.

At step S169, the filtering processing section 241a decides whether or not unprocessed section information is included in the section information included in the program-aimed basic navigation information 233. If it is decided that unprocessed section information exists, then the processing returns to step S161. In other words, the processes at steps S161 to S169 are repeated until after there remains no unprocessed information any more. Then, if it is decided that there remains no unprocessed section information, then the processing is ended.

In short, only that information in which it is considered that the user is interested is selected from and remains within the program-aimed basic navigation information 233 by the filtering process.

Referring back to the flow chart of FIG. 13, if it is decided at step S133 that, for example, user added information, that is, a restriction condition, is not added, then the process at step S134 is skipped.

At step S135, the information addition section 241b accesses the point history information database 249 to decide whether or not a request for production of personalized navigation information is received from the user by whom the marking information has been produced and point history information then remains.

If it is decided at step S135 that such point history information remains, then the information addition section 241b executes a history information addition process at step S136.

Figure 16:
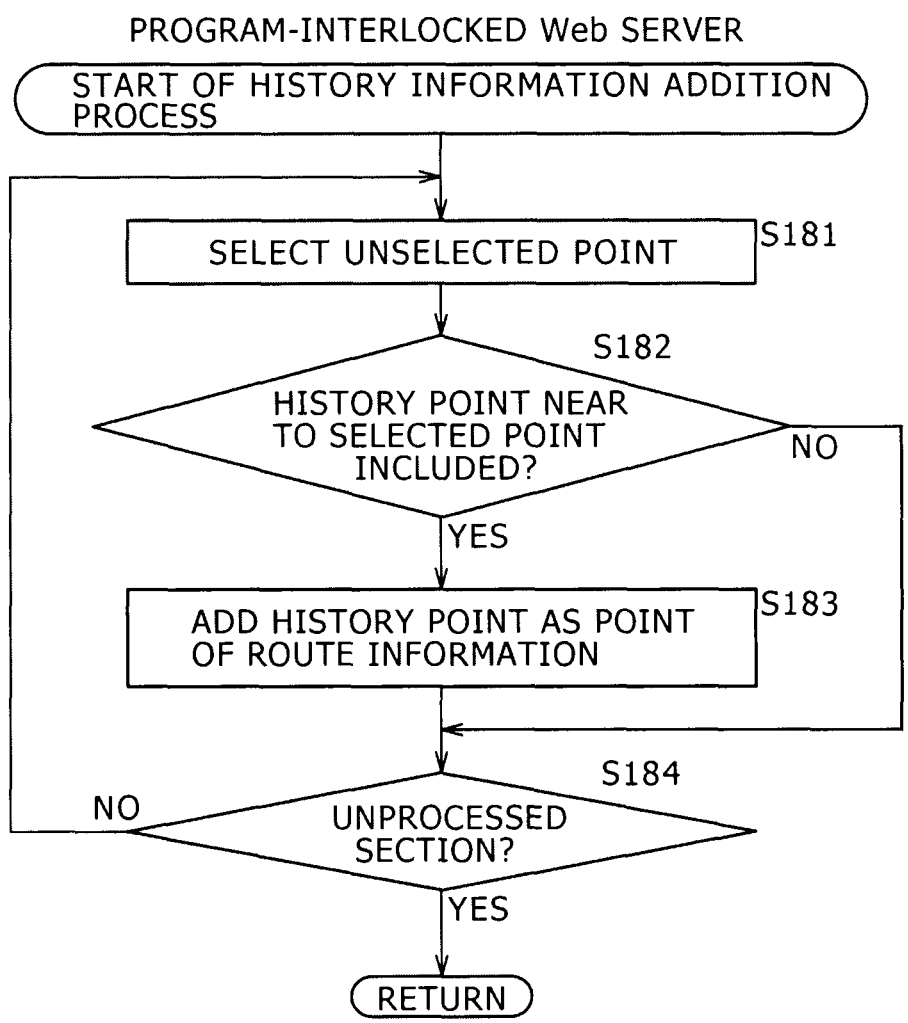
FIG. 16 is a flow chart illustrating a history information addition process.

Here, the history information addition process is described with reference to a flow chart of FIG. 16.

At step S181, the information addition section 241b selects one of unprocessed points 406 from among the points registered in the personalized navigation information by the processes described hereinabove.

At step S182, the information addition section 241b compares the position information of the latitude and the altitude of the selected point 406 and the position information of history points 261 produced in the past with each other to decide whether or not a history point is included in the proximity of the selected point 406. For example, if the selected point is within a predetermined distance from one of the history points produced in the past, then it is decided that the selected point exists in the proximity of the history point and hence is decided that the history point is included in the proximity of the selected point 406. Then, the processing advances to step S183.

At step S183, the information addition section 241b decides that the history point existing in the proximity of the selected point 406 is decided as a point in which the user was interested in the past, and adds the history point as a point 406 of the route information 405 of the personalized navigation information being currently produced.

On the other hand, if the selected point is not within the predetermined distance from any of the history points produced in the past, then the process at step S183 is skipped.

At step S184, the information addition section 241b decides whether or not unprocessed section information remains. If it is decided that unprocessed section information remains, then the processing returns to step S181. In other words, the processes at steps S181 to S184 are repeated until after there remains no unprocessed section information any more. Then, if it is decided at step S184 that no unprocessed section information remains, then the processing is ended.

By such a history information addition process as described above, a point selected by the same user which was interested in the point in the past is added if it is in the proximity of any point within a section included in the route currently handled. Therefore, for example, it is possible to set a point which was selected as personalized navigation in the past. As this process is repeated, it gradually becomes possible to set a point conforming to the liking of the user without particularly designating restriction information or the like.

Referring back to the flow chart of FIG. 13, at step S137, the information addition section 241b accesses the associate shop information DB 250 to decide whether or not an associate shop which provides coupon information or the like exists in the proximity of any of the points 406 registered as the personalized navigation information till then, that is, whether or not a coupon can be used.

For example, if it is decided at step S137 that coupon information can be utilized, then the information addition section 241b reads out associate shop information from the associate shop information DB 250 and adds the associate shop information as a point 406 and further adds the coupon information corresponding to the point 406 at step S138.

On the other hand, if it is decided at step S137 that coupon information cannot be utilized, then the process at step S138 is skipped.

At step S139, the marking information acquisition section 242 extracts date and time information and broadcast station information of the marking and supplies them to the search engine 243.

At step S140, the search engine 243 accesses the program scene information DB 244 based on the date and time information and the broadcast station information supplied thereto from the marking information acquisition section 242 to search for scene information of the corresponding date and time and broadcast station. Further, the search engine 243 extracts a URI multiplexed in the broadcast signal when the scene was broadcast and supplies the extracted URI to the browser section 245.

At step S141, the browser section 245 accesses a server not shown designated by the URI supplied thereto to download various data represented by an HP and supplies the downloaded data to the extraction section 246.

At step S142, the extraction section 246 extracts, based on the data of an HP or the like supplied thereto from the browser section 245, information representative of a position from within text information of an address, a telephone number or the like represented in the data, and supplies the extracted information to the position information production section 247.

More particularly, the extraction section 246 extracts information representative of a position such as an address or a telephone number from within information supplied thereto from the browser section 245 and forming a predetermined HP, that is, for example, text information, and supplies the extracted information to the position information production section 247. Further, the information which represents a position may be extracted by the extraction section 246 such that, for example, text characters are extracted and displayed such that the user may select a position or a search function is utilized. For example, where a character string of an address is extracted using a search function, the extraction section 246 searches for a keyword representative of an address such as "prefecture", "city" or "town" and decides and extracts character strings preceding and following the searched out keyword as those representing an address.

Further, the extraction section 246 searches, as a character string of a telephone number, such a keyword as "telephone" or "TEL" and decides and extracts a character string following the keywords as a telephone number. Furthermore, the extraction section 246 searches for a character string of a particular pattern such as "03-" or "048-" and decides and extracts the character string as part of a telephone number.

At step S143, the position information production section 247 uses the information supplied thereto from the extraction section 246 and representative of a position such as an address or a telephone number to search out and read out corresponding information of the latitude and the altitude from the position database 248 to produce position information, and supplies the position information to the personalized navigation information production section 241. At this time, the personalized navigation information production section 241 registers the position information supplied thereto from the position information production section 247 as a point 406 of the personalized navigation information.

By the process, a point relating to a place in which the user is interested while the user watches the broadcast program can be included into the personalized navigation information.

At step S144, the personalized navigation information production section 241 searches for and sets a route from the starting point to the destination (ending point) based on the section information included in the produced personalized navigation information.

At step S145, the personalized navigation information production section 241 produces personalized navigation information which can be recognized by the car navigation apparatus 11 based on the thus produced personalized navigation information and the information of the route to be used for a route guidance.

At step S146, the personalized navigation information production section 241 records the information of the points 406 included in the produced personalized navigation information into the point history information database 249, thereby ending the processing.

Consequently, since, by the process described above, user added information, that is, a restriction condition by the user, a history in the past and marking information set during watching of a broadcast program are taken into consideration, personalized navigation information which includes a point in which the user is interested or a point closest to the liking of the user is produced. Further, as history points are accumulated, the possibility that a point which conforms to the liking of the user may be extracted increases. Consequently, for example, even if the user forgets to set a restriction condition or the like, the possibility that a point conforming to the liking of the user may be included as a point on the route can be enhanced.

Referring back to the flow chart of FIG. 11, at step S76, the control section 231 controls the communication section 234 to transmit the personalized navigation information produced by the personalization engine 8a as a process result to the HDD recorder 4.

At step S61, the control section 201 of the HDD recorder 4 controls the communication section 202 to receive the process result transmitted from the program-interlocked web server 8.

At step S62, the control section 201 decides whether or not the received process result is personalized navigation information. For example, if personalized navigation information is transmitted from the program-interlocked web server 8 as a result of the process at step S76, then the processing advances to step S63.

At step S63, the control section 201 controls the drive 205 to record the received personalized navigation information on the removable medium 9. At this time, if the personalized navigation information includes coupon information, then the control section 201 controls the card reader 206 to record the coupon information into the IC card 10.

On the other hand, if it is decided at step S74 that the settlement result is not settlement completed, then the control section 231 controls the communication section 234 at step S77 to transmit a notification representing that the service cannot be provided to the HDD recorder 4.

As a result, since the process result is not personalized navigation information at step S62, the control section 201 controls the outputting section 211 at step S64 to display on the television receiver 6 that the service cannot be provided.

Through the process described above, personalized navigation information conforming to the interest and the liking of the user can be provided based on marking information at a timing desired by the user during watching of a broadcast program, a restriction condition by user-added information and history points in the past. Further, by providing added values to navigation data based on information supplied from the user in this manner, a business model can be produced from a production service of navigation data.

Figure 17:
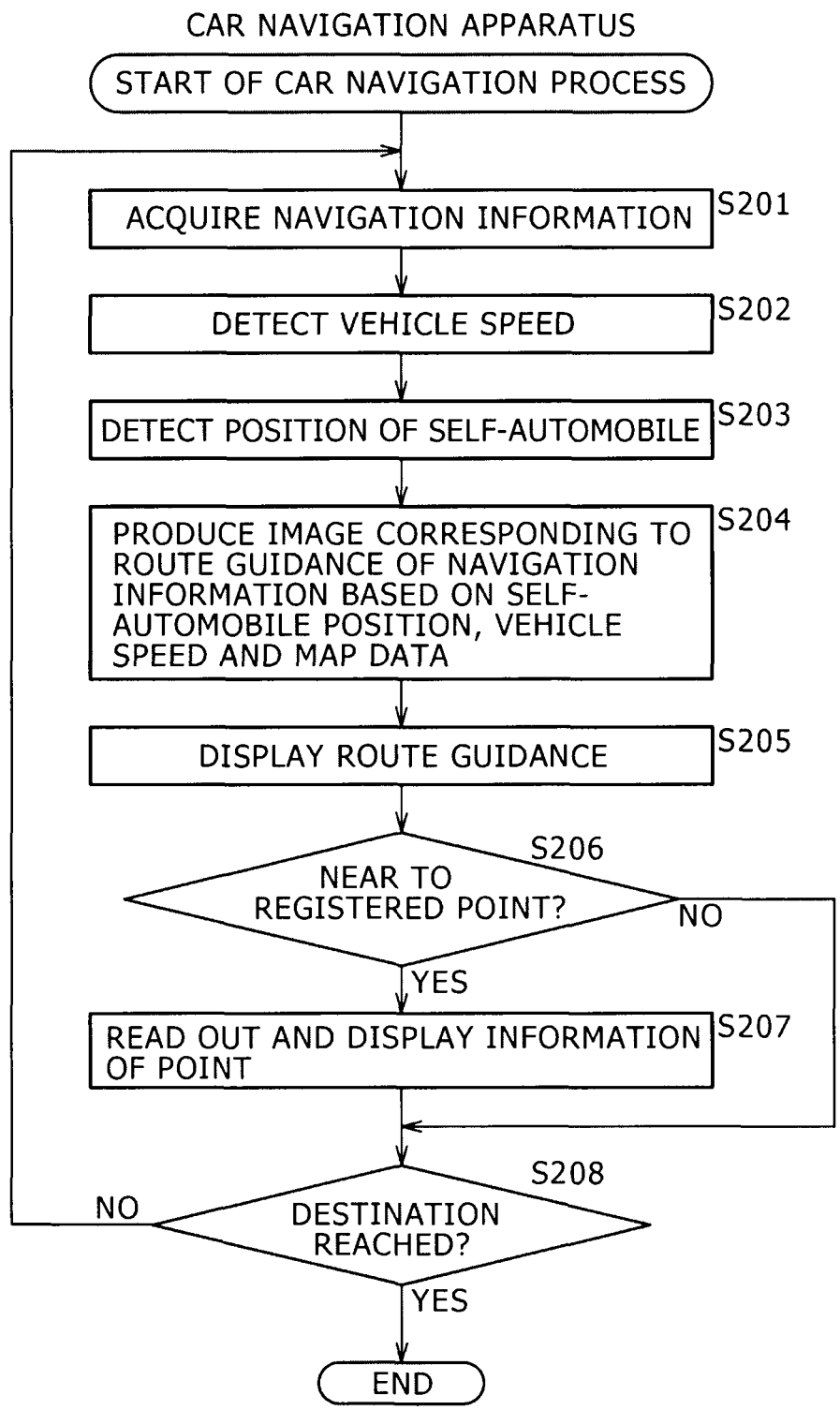
FIG. 17 is a flow chart illustrating a car navigation process.

Now, a car navigation process by the car navigation apparatus 11 is described with reference to a flow chart of FIG. 17.

At step S201, the control section 281 controls the drive 289 to acquire personalized navigation information from a removable medium 9 on which the personalized navigation information is recorded through the personalized navigation information distribution process described hereinabove with reference to the flow chart of FIG. 11 and supplies the acquired personalized navigation information to the car navigation image production section 283.

At step S202, the vehicle speed detection section 121 detects the vehicle speed based on the vehicle speed pulse of the automobile and information acquired from a three-dimensional acceleration sensor not shown or the like and supplies the detected vehicle speed to the car navigation image production section 283.

At step S203, the GPS section 120 detects the latitude and the altitude of the position of the automobile based on signals transmitted from satellites not shown and supplies a result of the detection to the car navigation image production section 283.

At step S204, the car navigation image production section 283 produces an image corresponding to a route guidance recorded in the personalized navigation information based on the position of the automobile supplied from the GPS section 120, the vehicle speed supplied from the vehicle speed detection section 121 and the map data 284.

At step S205, the control section 281 controls the display section 290 to display the car navigation image produced by the car navigation image production section 283 to execute a route guidance.

At step S206, the car navigation image production section 283 decides whether or not the position of the automobile acquired from the GPS section 120 is in the proximity of any of the positions of the points 406 included in the car navigation data. For example, if the position of the automobile is in the proximity of any of the points 406, then the car navigation image production section 283 reads out the information of the point 406 in the proximity of the position of the automobile and produces a car navigation image at step S207. The control section 281 controls the display section 290 to display the car navigation image of the information of the point 406 in the proximity of the position of the automobile produced in this manner.

On the other hand, if it is decided at step S206 that no point 406 is present in the proximity of the position of the automobile, then the process at step S207 is skipped.

At step S208, the car navigation image production section 283 decides whether or not the position of the automobile supplied from the GPS section 120 reaches the destination (ending point) (is in the proximity of the destination). If it is decided that the position of the automobile does not reach the destination, then the processing returns to step S201. In other words, the processes at steps S201 to S208 are repeated until after the destination is reached. Consequently, the process that, while a route guidance is displayed, every time the automobile comes near to the position of a point 406 in which the user is interested or which conforms to the liking of the user, the information of the point 406 is displayed is repeated.

If it is decided at step S208 that the position of the automobile reaches the destination (ending point), then the processing is ended.

Through the process described above, a route guidance produced conforming to the interest and the liking of the user can be implemented based on marking information recorded at a timing desired by the user during watching of a broadcast program, a restriction condition by user-added information and history points in the past. Further, if a point conforming to the interest or the liking of the user is displayed at every key point of the route, then, for example, such a situation that the automobile passes over a place which the user wants to stop over because the user forgets stopping over the place can be suppressed.

Further, by the process described above, a guidance is provided in accordance with a route set through watching of a broadcast program. Therefore, even if the user travels along the route for the first time, such a feeling that the user might travel along a familiar route can be provided to the user, and this provides some leisureliness and composure to the user in driving. As a result, an error in driving can be suppressed and occurrence of an unexpected accident can be prevented.

Now, a coupon service process by the shop terminal 13 is described with reference to a flow chart of FIG. 18.

At step S221, the control section 331 controls the card reader 336 to decide whether or not an IC card 10 is loaded in the card reader 336. Thus, the process is repeated until after it is decided that an IC card 10 is loaded in the card reader 336. For example, if the user purchases a commodity in the shop and an IC card 10 is loaded into the card reader 336 in order for the user to perform a settlement process, then the processing advances to step S222.

At step S222, the control section 331 controls the card reader 336 to read out information recorded in the IC card 10 loaded in the card reader 336.

At step S223, the control section 331 decides whether or not a transaction money amount is inputted. Thus, the process is repeated until after a transaction money amount is inputted. If a transaction money amount is inputted at step S223, then the control section 331 decides at step S224 from the information read out from the IC card 10 whether or not a coupon which can be utilized in the shop is recorded in the IC card 10. For example, if coupon information is recorded in the IC card 10 through the process described hereinabove with reference to the flow chart of FIG. 11, then since the coupon information is recorded in the IC card 10, the processing advances to step S225.

At step S225, the control section 331 sets an amount of money discounted from the transaction money amount based on the coupon information as a settlement money amount.

At step S226, the control section 331 controls the authentication processing section 333 to execute a settlement process of the set settlement money amount. It is to be noted that the settlement process is similar to the process described hereinabove with reference to the flow chart of FIG. 12, and therefore, description of the settlement process is omitted herein to avoid redundancy.

At step S227, the control section 331 controls the communication section 334 to receive a settlement result.

At step S228, the control section 331 decides whether or not the settlement result represents settlement completed. If it is decided that the settlement result is settlement completed, then the control section 331 controls the card reader 336 at step S229 to delete the coupon information recorded in the IC card 10.

On the other hand, if it is decided at step S228 that the settlement result is not settlement completed, that is, the settlement result is settlement not completed, then the control section 321 controls the display section 335 at step S230 to display that the service of performing a settlement process using the IC card 10 cannot be provided.

Through the process described above, by providing coupon information with regard to a shop which is, for example, a sponsor of a broadcast program such as a travel program, profitable information can be provided to a user who watches the travel program and produces personalized navigation information. Further, an integrated business model including a broadcast program, a shop and car navigation data can be formed.

While the foregoing description is directed to an example wherein the HDD recorder 4 is used for production of marking information and acquisition of navigation data, the apparatus to be used for such production of marking information and acquisition of navigation data is not limited to the HDD recorder 4, but any electronic apparatus can be applied only if it has a function of marking and recording a broadcast program. For example, a DVD recorder may be applied.

Further, the foregoing description is directed to a case wherein a settlement process including some discount is described as an example of a service provided making use of coupon information. However, some other service may be provided. For example, not a coupon but an electronic ticket may be distributed such that a user can enter an event place immediately utilizing an IC card 10 at the entrance of the event place.

As described above, according to the navigation data distribution system of the present embodiment, by utilizing a broadcast program such as a travel program and information on the Internet corresponding to the broadcast program, navigation data conforming to the interest and the liking of a user can be produced readily. Further, a production service of navigation data based on a broadcast program and/or a business model in which coupon information is used can formed readily.

It is to be noted that, while the series of processes described above can be executed by hardware, it may otherwise be executed by software. Where the blocks of the functions shown in FIGS. 5 to 9 are formed from hardware, the series of processes described above can be executed by the hardware. Where the series of processes is executed otherwise by software, a program which constructs the software is installed from a recording medium into a computer incorporated in hardware for exclusive use or, for example, a personal computer for universal use which can execute various functions by installing various programs.

Figure 2:
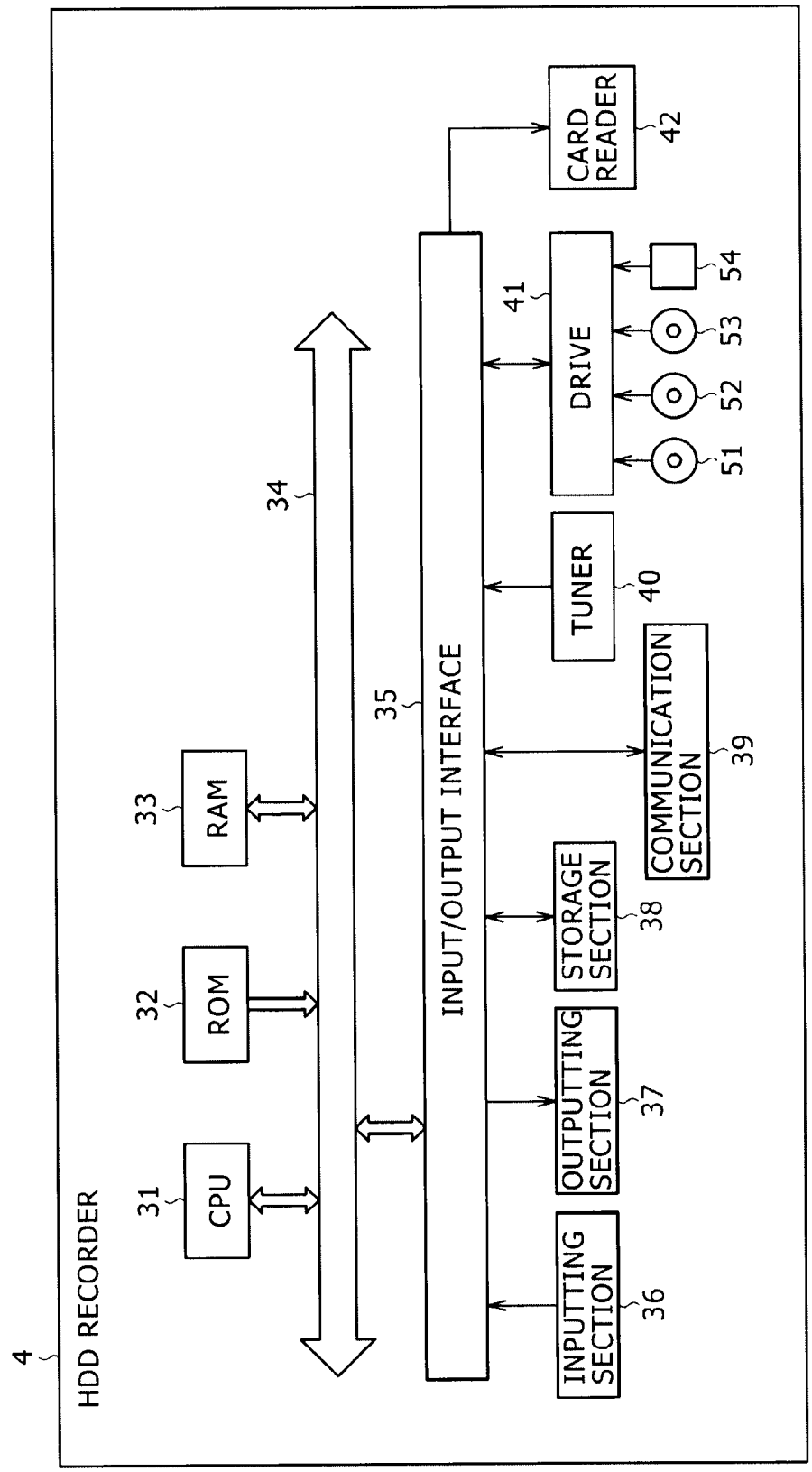
FIG. 2 is a block diagram showing a configuration of an HDD recorder shown in FIG. 1.
Figure 3:
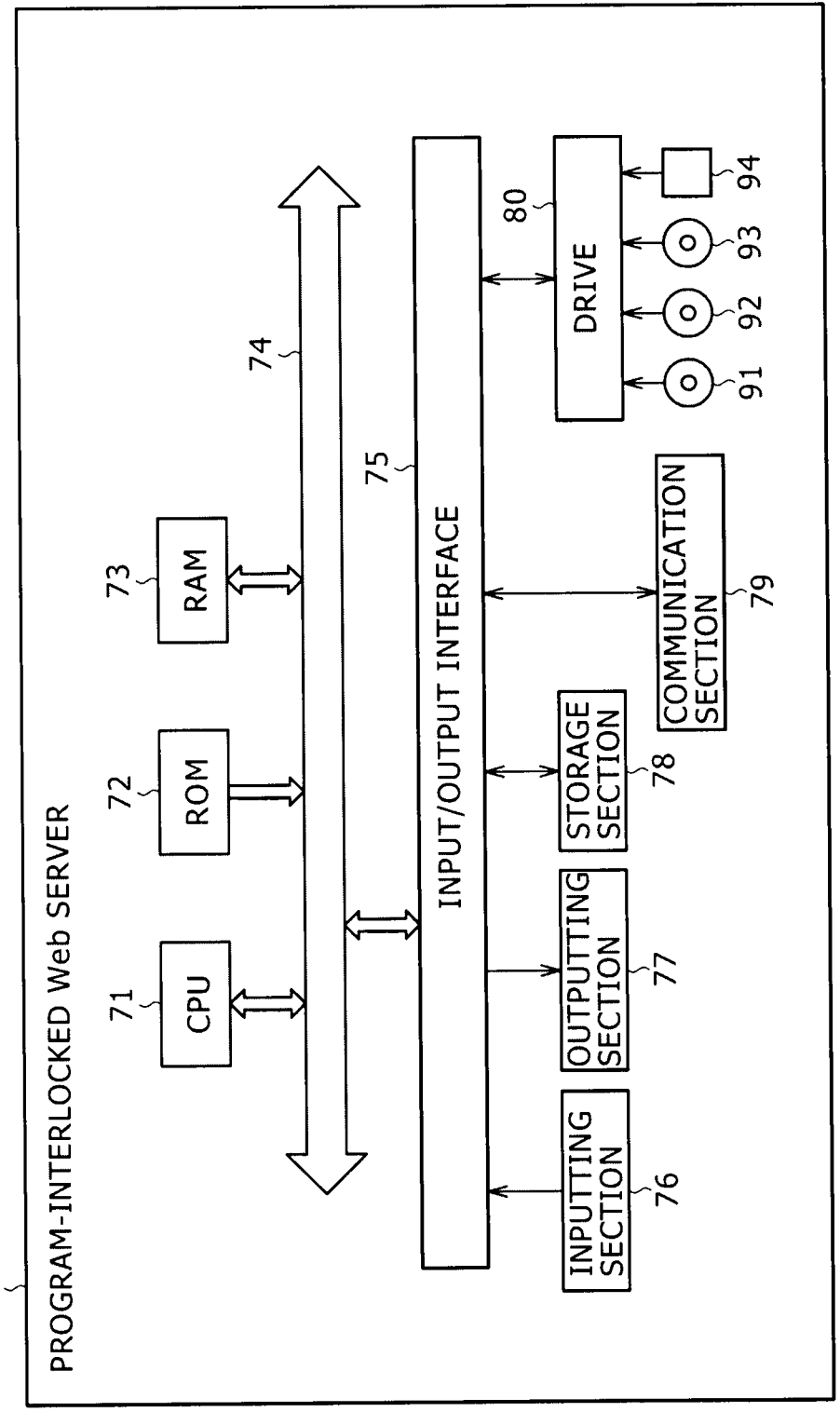
FIG. 3 is a block diagram showing a configuration of a program-interlocked web server shown in FIG. 1.

The recording medium may be formed as a package medium such as, as shown in FIGS. 2 to 4, a magnetic disc 51, 91 or 131 (including a floppy disc), an optical disk 52, 92 or 132 (including a CD-ROM (Compact Disc-Read Only Memory) and a DVD (Digital Versatile Disc)), a magneto-optical disc 53, 93 or 133 (including an MD (Mini Disc)), or a semiconductor memory 54, 94 or 134 which has the program recorded thereon or therein and is distributed to provide the program to a user separately from a computer. Else, the recording medium is formed as a ROM 32, 72 or 112, a hard disc included in the storage section 38, 78 or 118 in which the program is recorded and which is provided to a user in a state wherein the program is incorporated in a computer in advance, or the like.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus formed from a plurality of component apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
a reception section that receives marking information from a different information processing apparatus and corresponding to a scene of a broadcast program, the marking information indicating a broadcast station and a broadcast time; and
a processing unit configured to extract a Universal Resource Identifier (URI) based on the broadcast station and the broadcast time, and to produce navigation information associated with the scene of the broadcast program, based on the URI, wherein the navigation information defines a latitude.

2. The information processing apparatus according to claim 1, wherein the processing unit accesses a server designated by the URI to download data, the processing unit further configured to extract information representative of a position from the data and to read out the latitude based on the position.

3. The information processing apparatus according to claim 2, wherein the processing unit searches the data for a keyword and extracts a character string adjacent to the keyword to extract the information representative of the position.

4. The information processing apparatus according to claim 3, wherein the processing unit reads out the latitude based on the character string to produce position information.

5. The information processing apparatus according to claim 4, wherein the processing unit produces the navigation information based on the position information.

6. The information processing apparatus according to claim 3, wherein the keyword indicates a telephone number, and the character string follows the keyword.

7. The information processing apparatus according to claim 2, wherein the data defines a geographical address.

8. The information processing apparatus according to claim 1, wherein the navigation information is based on basic navigation information including route information for guiding a route followed by the broadcast program from a starting point to an ending point through a plurality of branches.

9. The information processing apparatus according to claim 8, wherein the reception section receives information of a restriction condition, and the processing unit executes a filtering process of the basic navigation information based on the restriction condition to produce the navigation information.

10. The information processing apparatus according to claim 9, wherein the processing unit performs the filtering process by determining whether a point of the route information satisfies the restriction condition and by not including the point in the navigation information in response to a determination that the point does not satisfy the restriction condition.

11. The information processing apparatus according to claim 9, wherein the processing unit performs the filtering process by determining whether a point of the route information satisfies the restriction condition, and the processing unit registers the point in the navigation information in response to a determination that the point does satisfy the restriction condition.

12. The information processing apparatus according to claim 8, wherein the processing unit is configured to perform a history information process to produce the navigation information by determining whether a point of the navigation information is within a predetermined distance from a history point produced in the past.

13. The information processing apparatus according to claim 12, wherein the processing unit performs the history information process by including the history point in the navigation information in response to a determination that the point of the navigation information is within the predetermined distance from the history point.

14. The information processing apparatus according to claim 8, wherein the processing unit is configured to determine whether a shop exists within a predetermined distance from a point in the navigation information and to include a point of the shop in the navigation information in response to a determination that the shop exists within the predetermined distance from the point in the navigation information.

15. The information processing apparatus according to claim 1, further comprising:
 a transmission section that transmits the navigation information to the different information processing apparatus.

16. The information processing apparatus according to claim 1, wherein the URI is multiplexed in a broadcast signal when the scene was broadcast.

17. The information processing apparatus according to claim 1, wherein the processing unit records information of points included in the navigation information into a memory.

18. An information processing method for an information processing apparatus, the information processing method comprising:
 receiving marking information from a different information processing apparatus and corresponding to a scene of a broadcast program, the marking information indicating a broadcast station and a broadcast time;
 extracting, with the information processing apparatus, a Universal Resource Identifier (URI) based on the broadcast station and the broadcast time; and
 producing, with the information processing apparatus, navigation information associated with the scene of the broadcast program, based on the URI, wherein the navigation information defines a latitude.

19. A recording medium on which a computer-readable program for an information processing apparatus is recorded, the program for causing a computer to execute a method comprising:
 receiving marking information from a different information processing apparatus and corresponding to a scene of a broadcast program, the marking information indicating a broadcast station and a broadcast time;
 extracting a Universal Resource Identifier (URI) based on the broadcast station and the broadcast time; and
 producing navigation information associated with the scene of the broadcast program, based on the URI, wherein the navigation information defines a latitude.

* * * * *